July 17, 1962 H. C. HANSEN 3,044,782
SPINDLE WITH FEEDER POSITION RECORD CHANGING PHONOGRAPHS
Filed May 28, 1958 15 Sheets-Sheet 1

INVENTOR.
HANS CHRISTIAN HANSEN
BY *Dicke and Craig*

ATTORNEYS

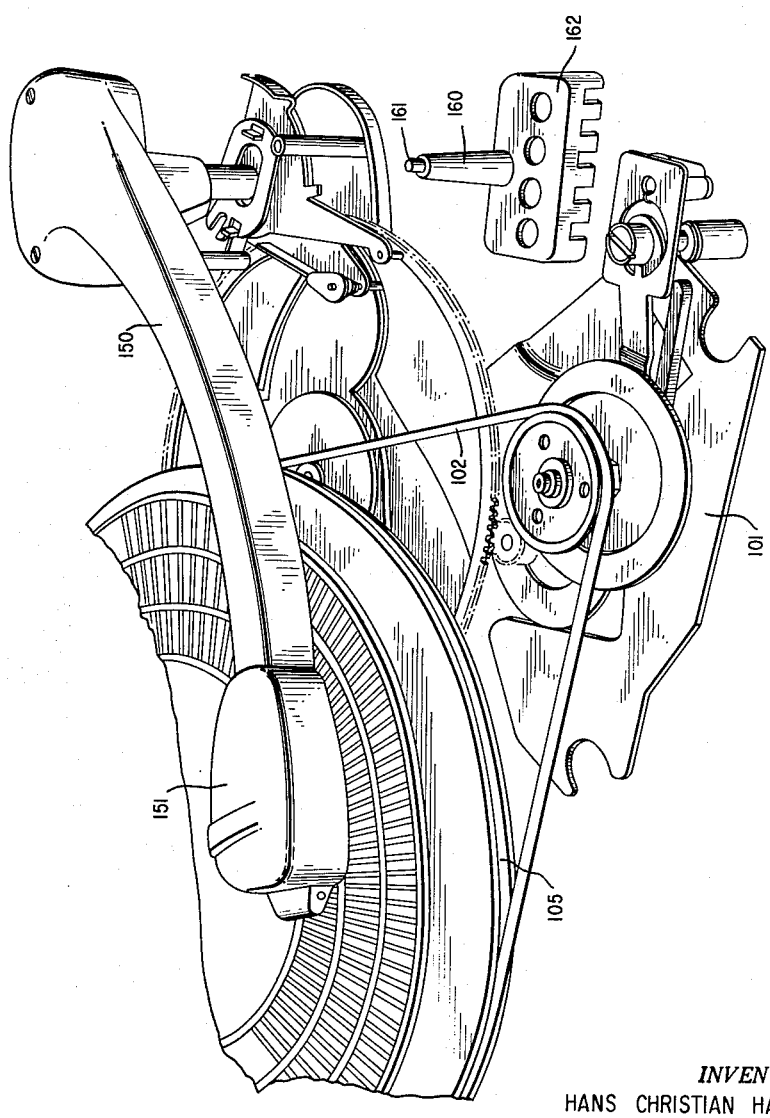

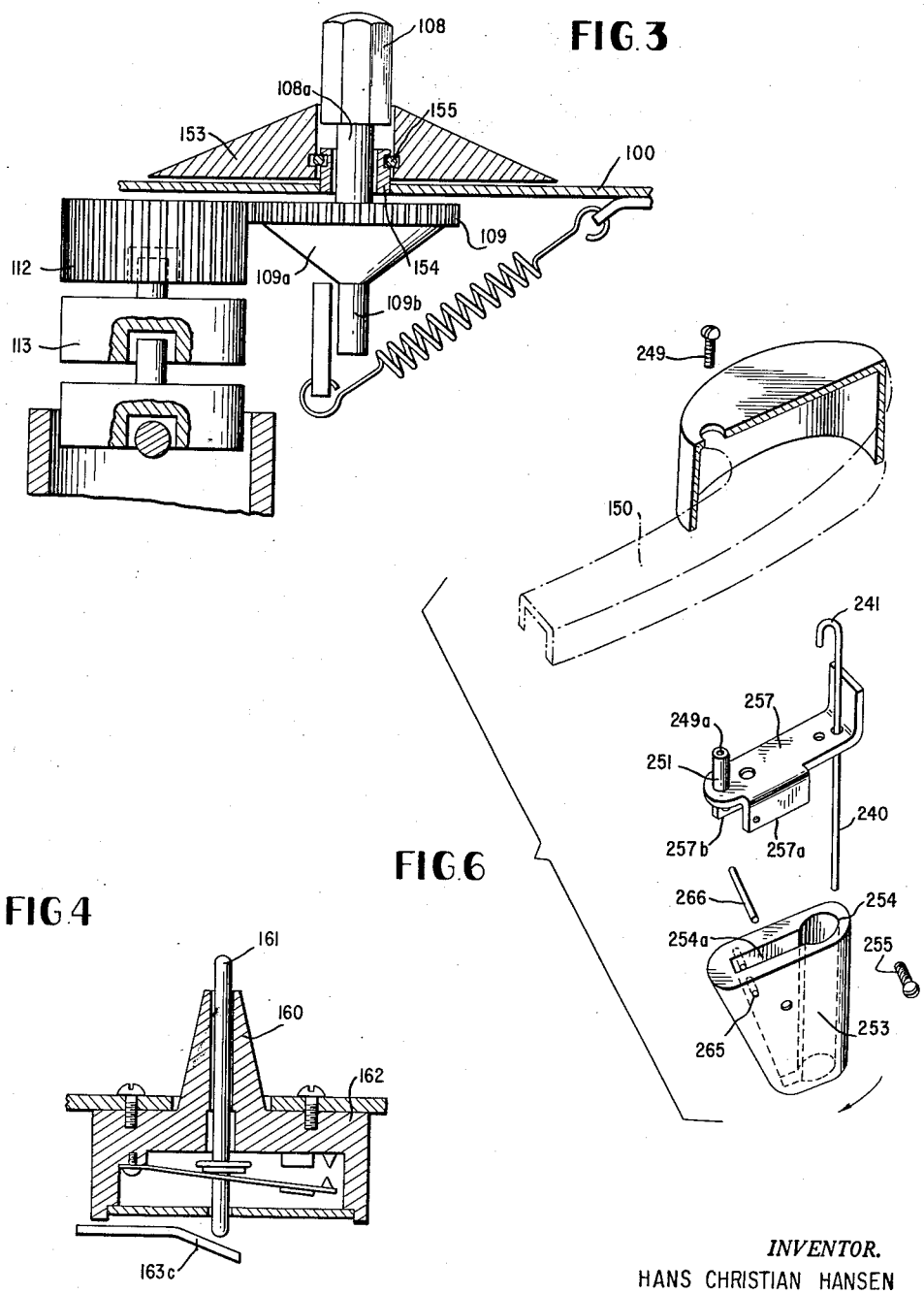

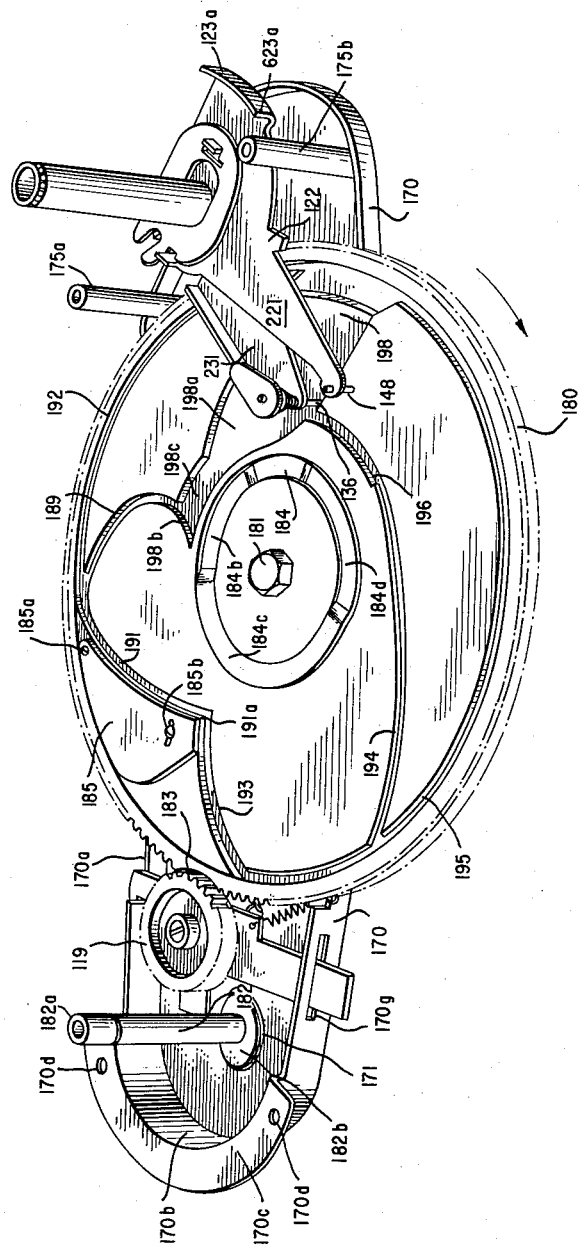

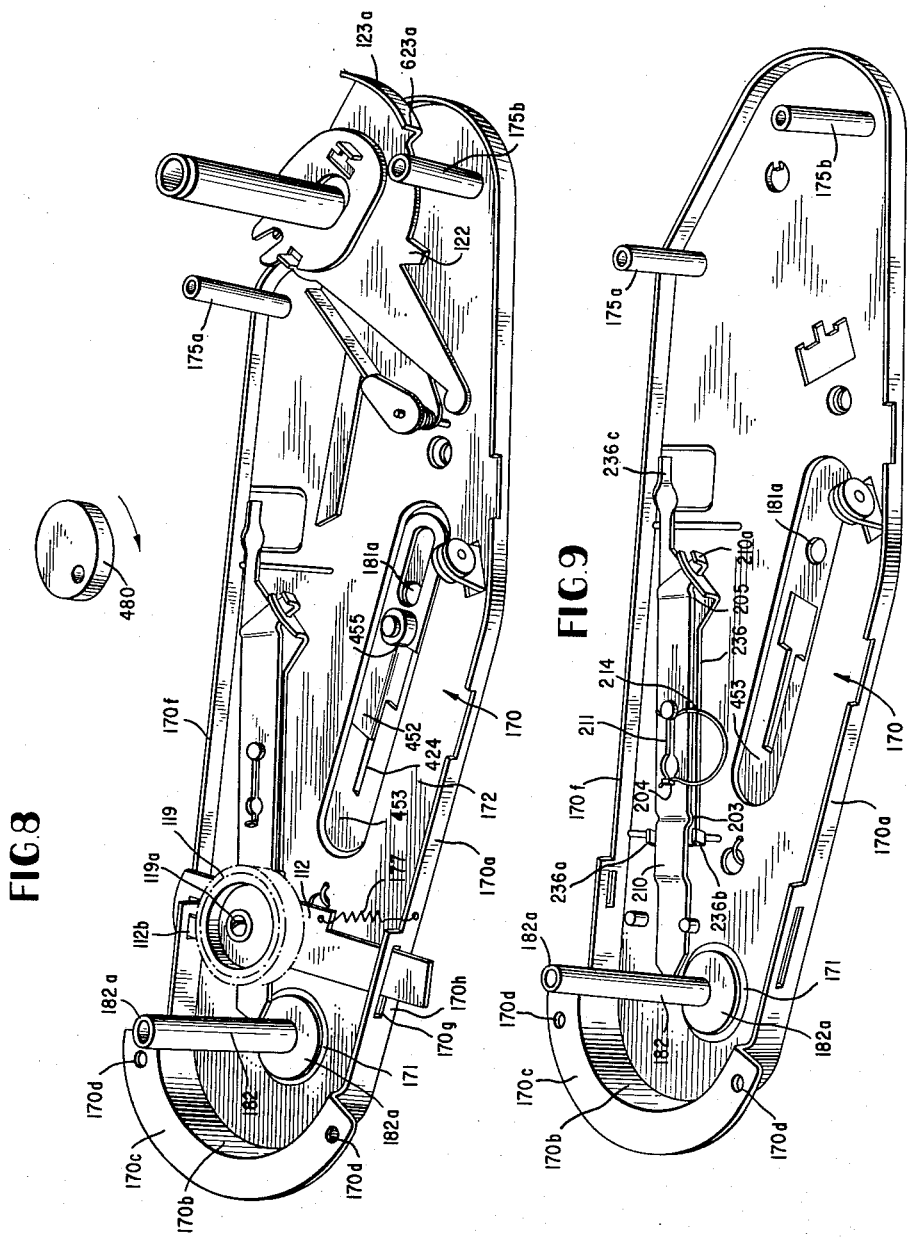

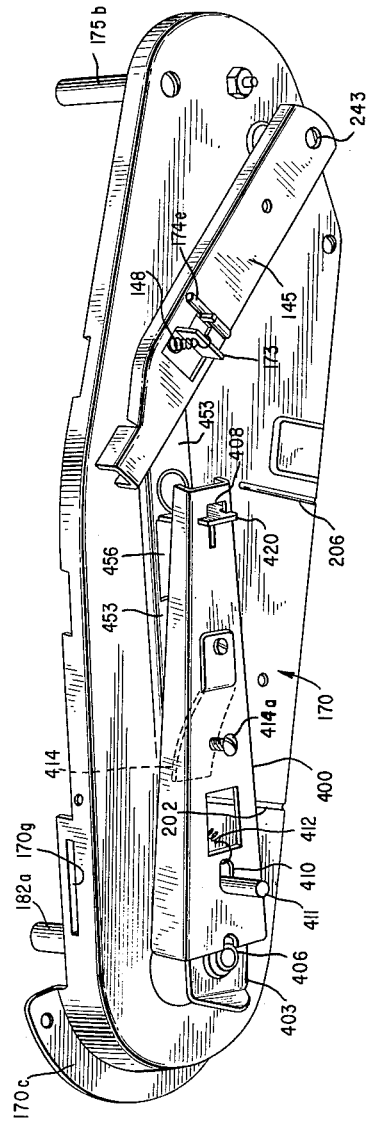

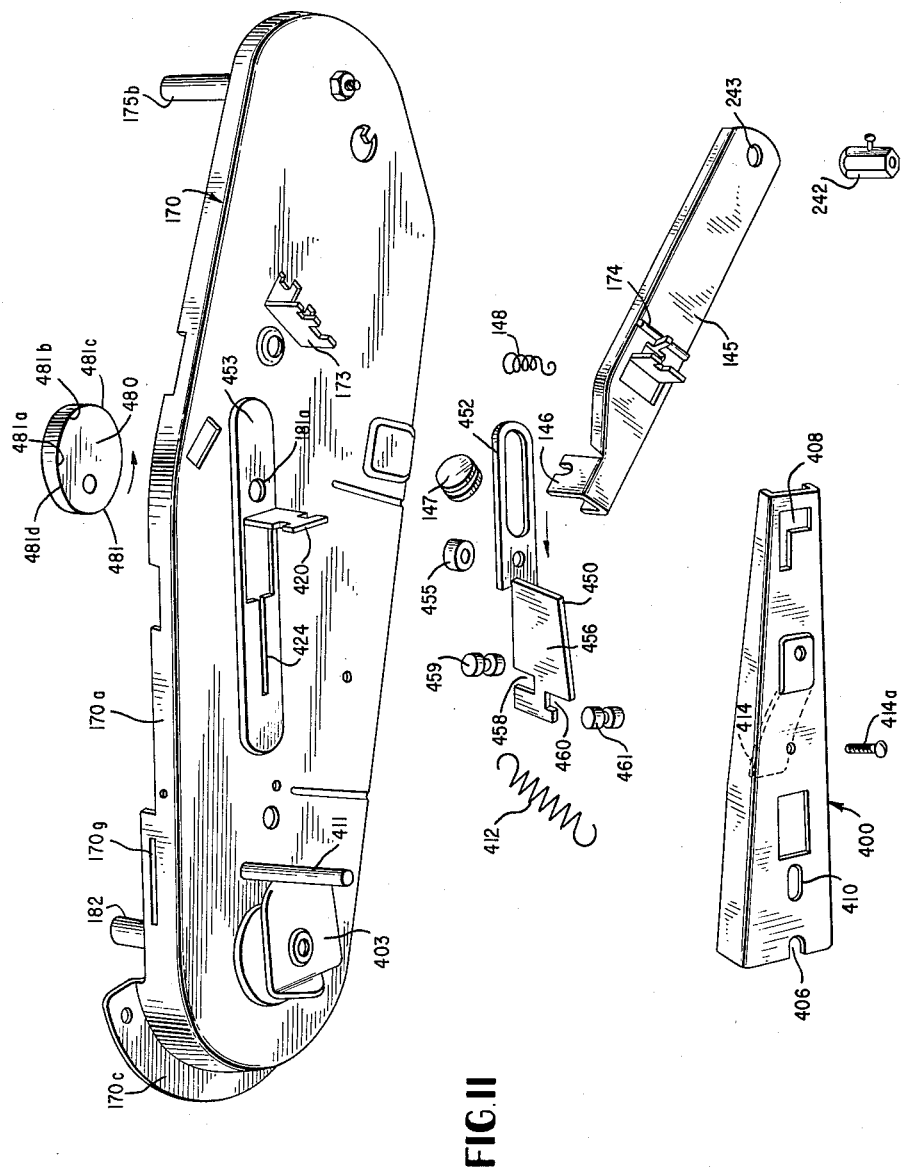

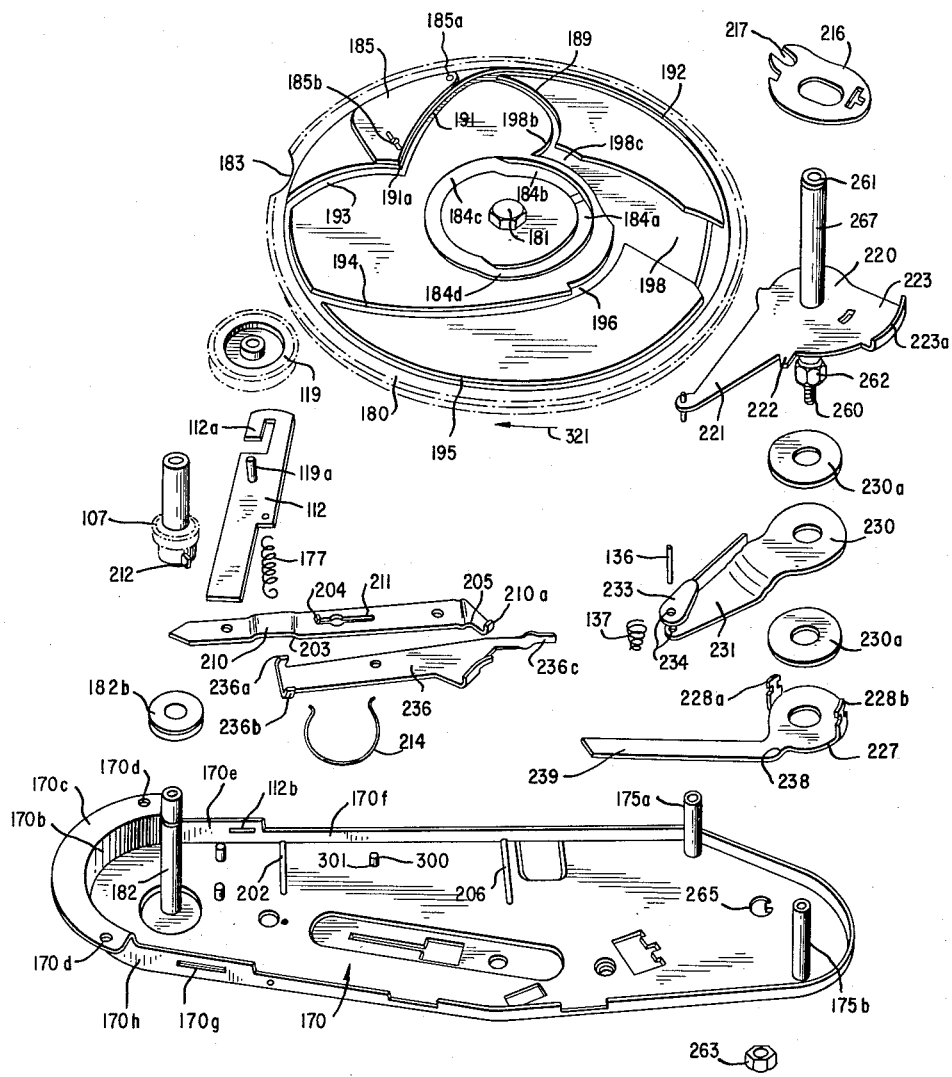

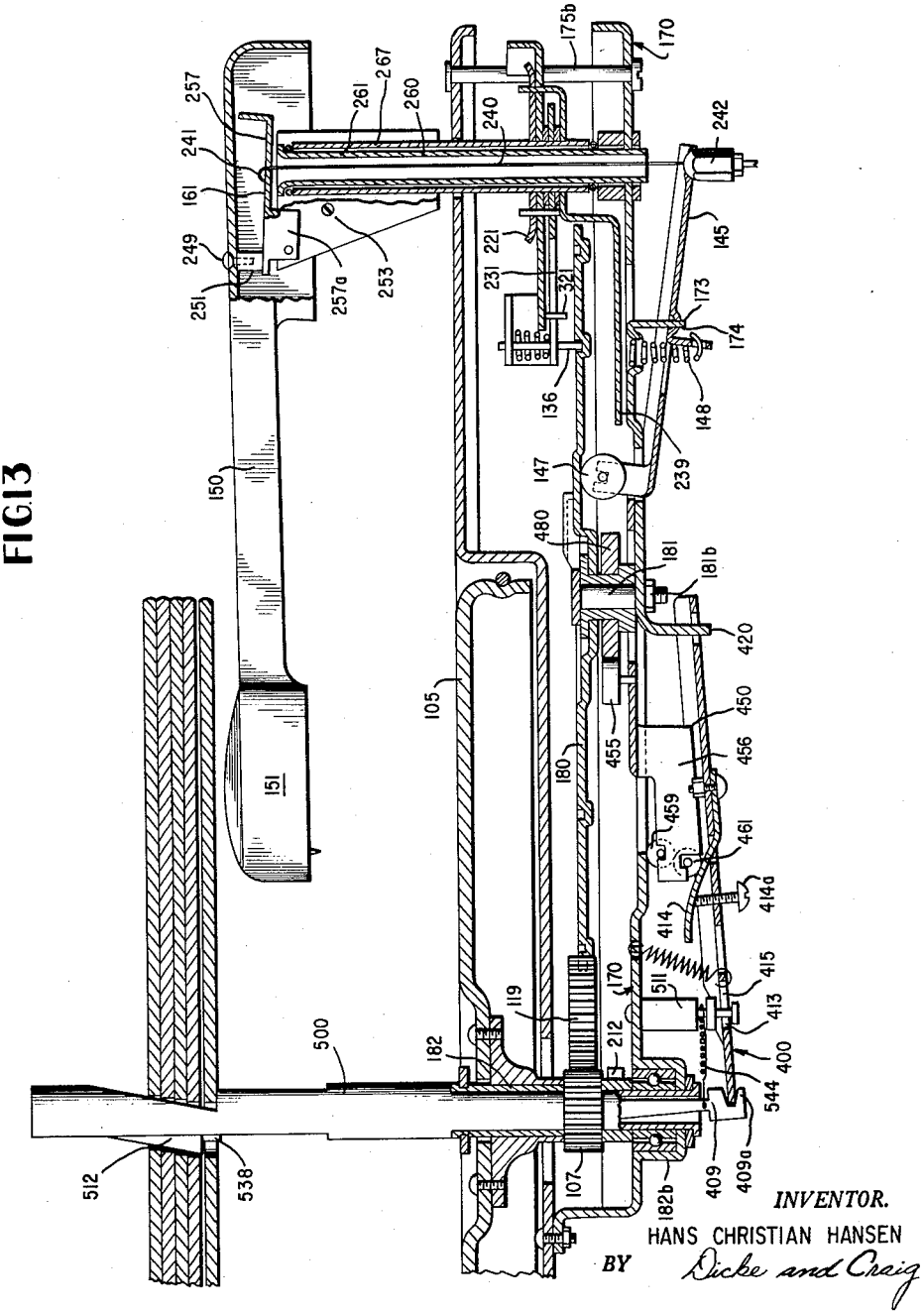

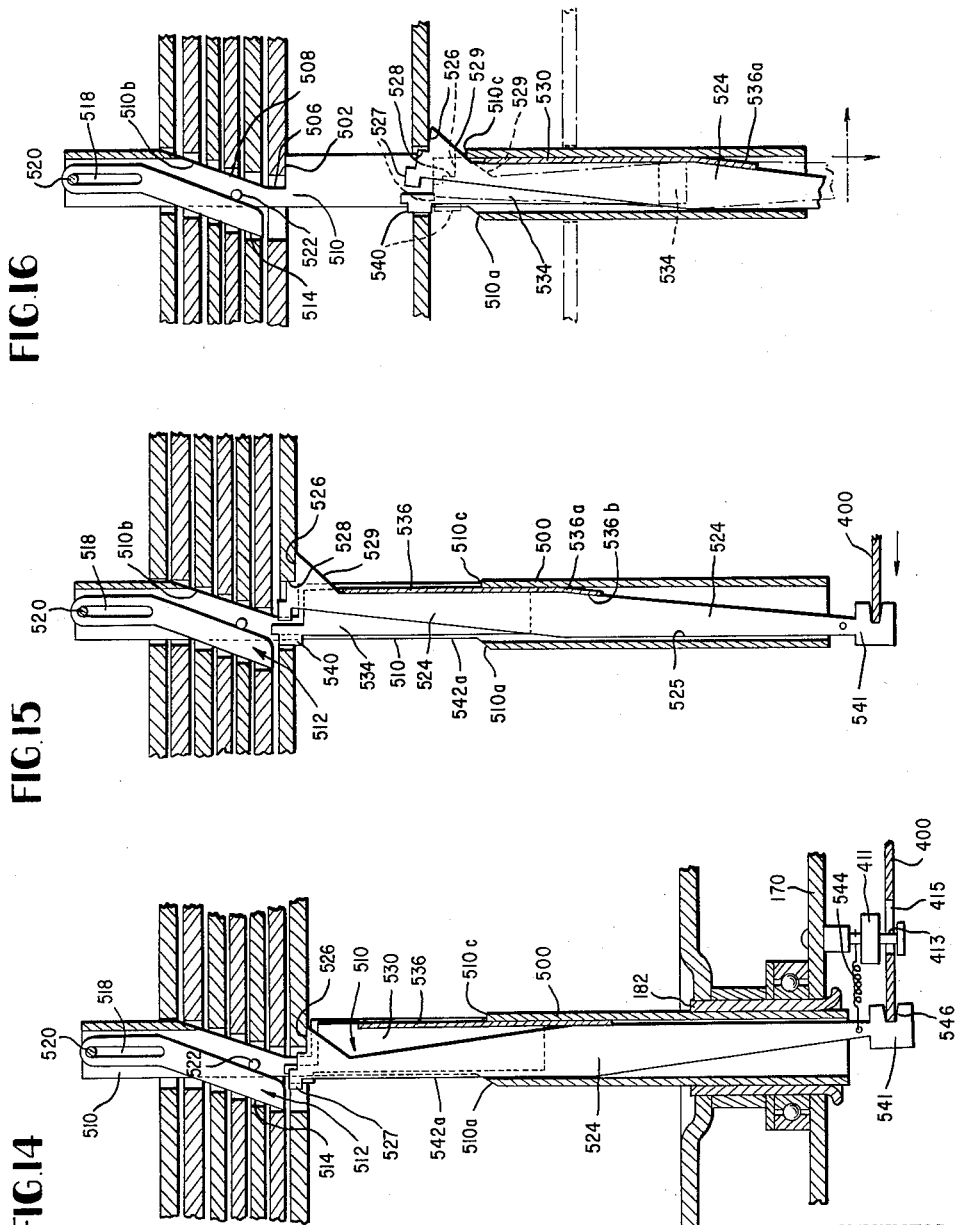

July 17, 1962 H. C. HANSEN 3,044,782
SPINDLE WITH FEEDER POSITION RECORD CHANGING PHONOGRAPHS
Filed May 28, 1958 15 Sheets-Sheet 12
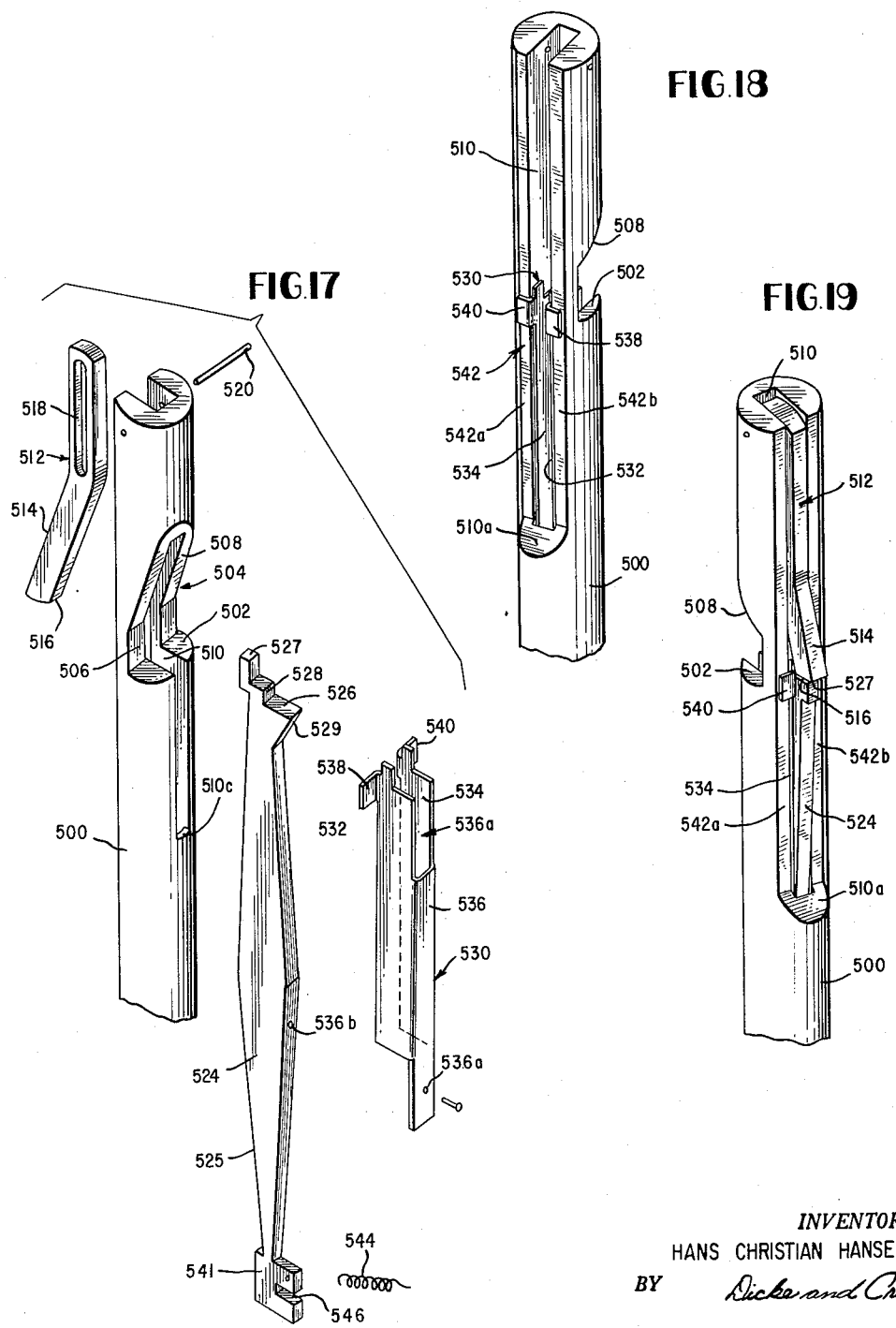
INVENTOR.
HANS CHRISTIAN HANSEN
BY Dicke and Craig
ATTORNEYS July 17, 1962 H. C. HANSEN 3,044,782
SPINDLE WITH FEEDER POSITION RECORD CHANGING PHONOGRAPHS
Filed May 28, 1958 15 Sheets-Sheet 13
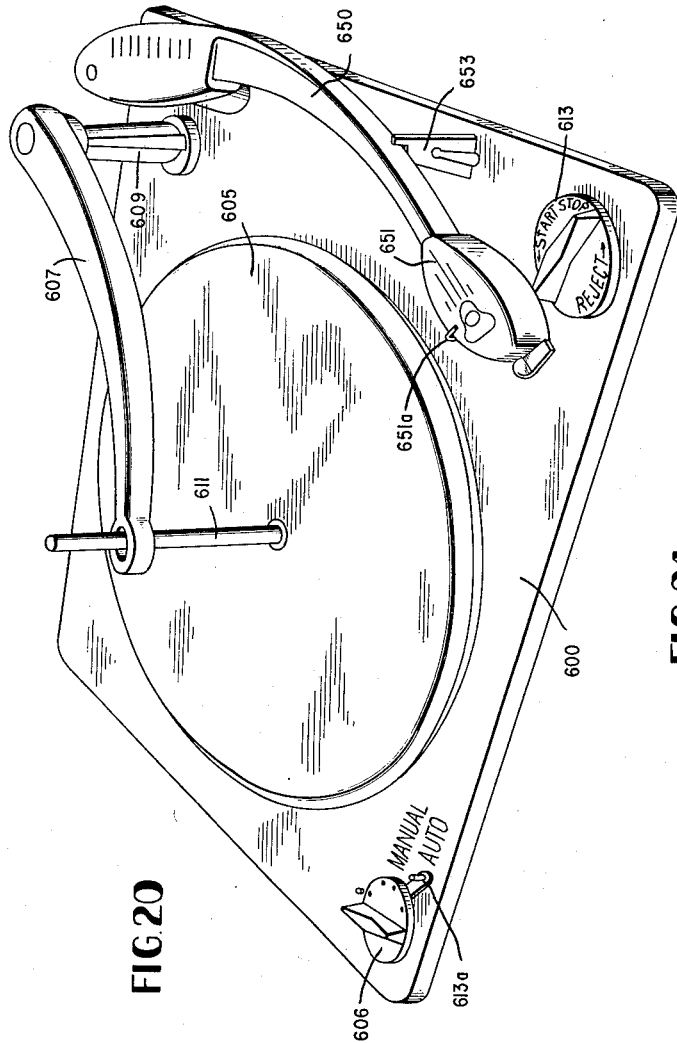
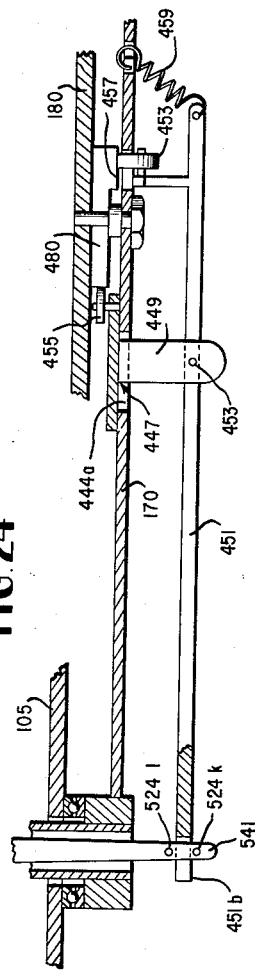
INVENTOR.
HANS CHRISTIAN HANSEN
BY *Dicke and Craig*
ATTORNEYS

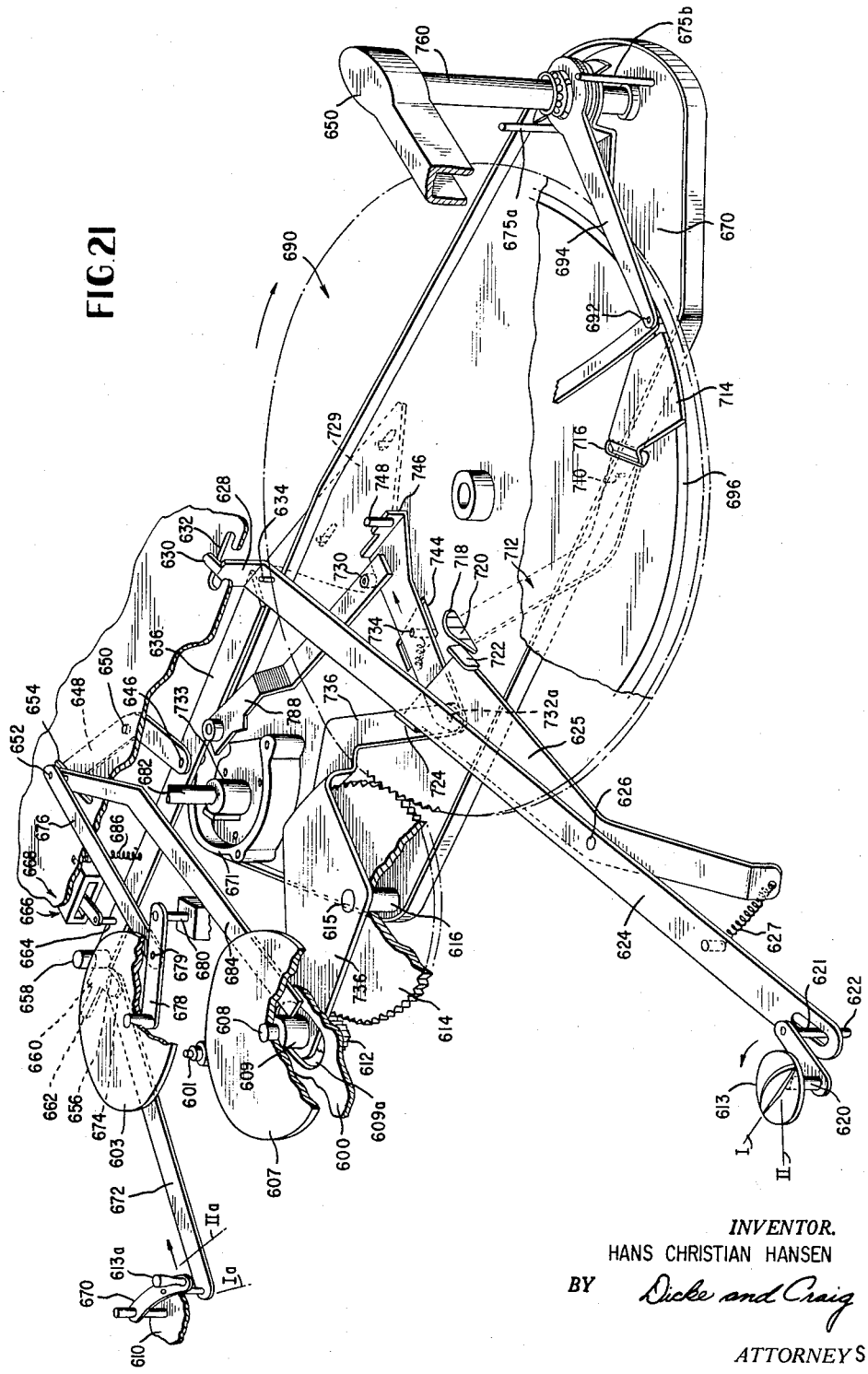

INVENTOR.
HANS CHRISTIAN HANSEN
BY Dicke and Craig
ATTORNEYS

United States Patent Office 3,044,782
Patented July 17, 1962

3,044,782
SPINDLE WITH FEEDER POSITION RECORD CHANGING PHONOGRAPHS
Hans Christian Hansen, Copenhagen, Denmark
Filed May 28, 1958, Ser. No. 738,478
Claims priority, application Great Britain May 31, 1957
15 Claims. (Cl. 274—10)

The present invention relates to phonographs for playing a plurality of records of different sizes in intermixed relationship.

It is an object of the invention to provide a phonograph having a center spindle for supporting a stack of records to be supplied one by one to the turntable in which the lowest record in the stack can be isolated in a position below the remaining records of the stack during a part of its movement to the turntable.

It is a further object of the invention to provide a phonograph in which the supply of a record from the stack to the turntable is rendered more safe.

It is a further object of the invention to provide a phonograph having means for supporting a stock of records in position above the turntable and in which the supply of the lowest record from said stack is in the form of a controlled movement of the record from a position being a part of the stack to an isolated position below the stack whereafter the record is allowed to drop to the turntable.

It is a further object of the invention to provide a phonograph having means for supporting a stack of records above the turntable and in which the lowest record of the stack is moved to a position isolated below the remaining part of the stack for the purpose of being gauged and in which the movement of the record to its isolated position is positively secured.

Still a further object of the invention is to provide a phonograph having a center spindle for supporting a stack of records in which the lowest record of the stack is positively clamped and pulled downwards through a part of its path before it is allowed to drop freely to the turntable.

Figure 1:
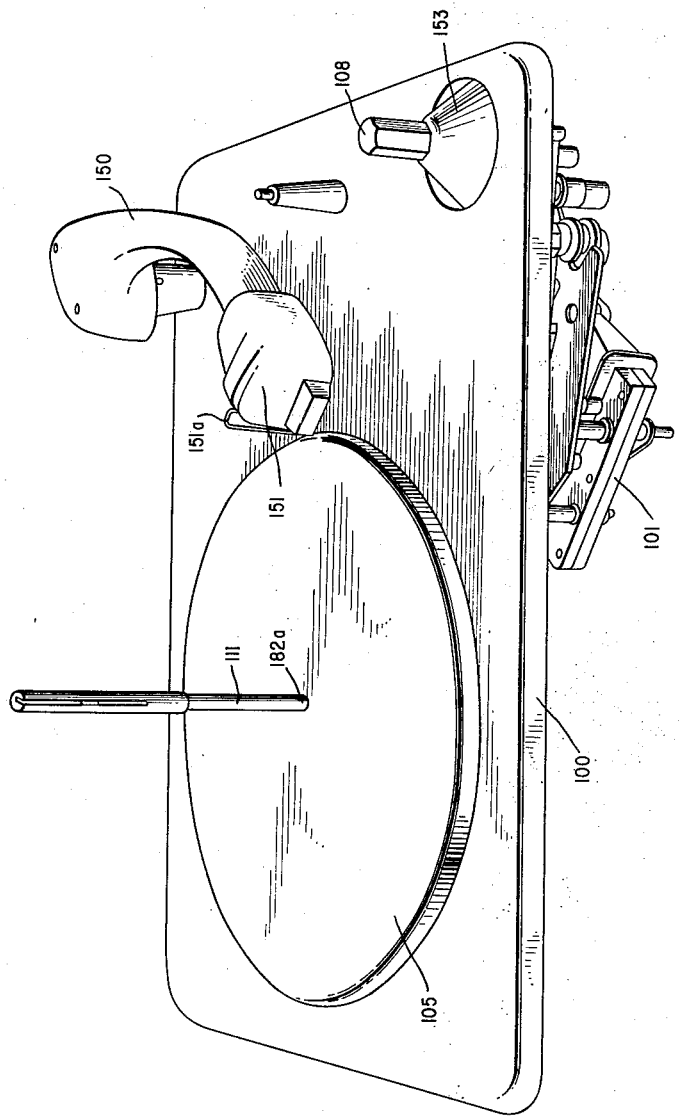
Figure 5:
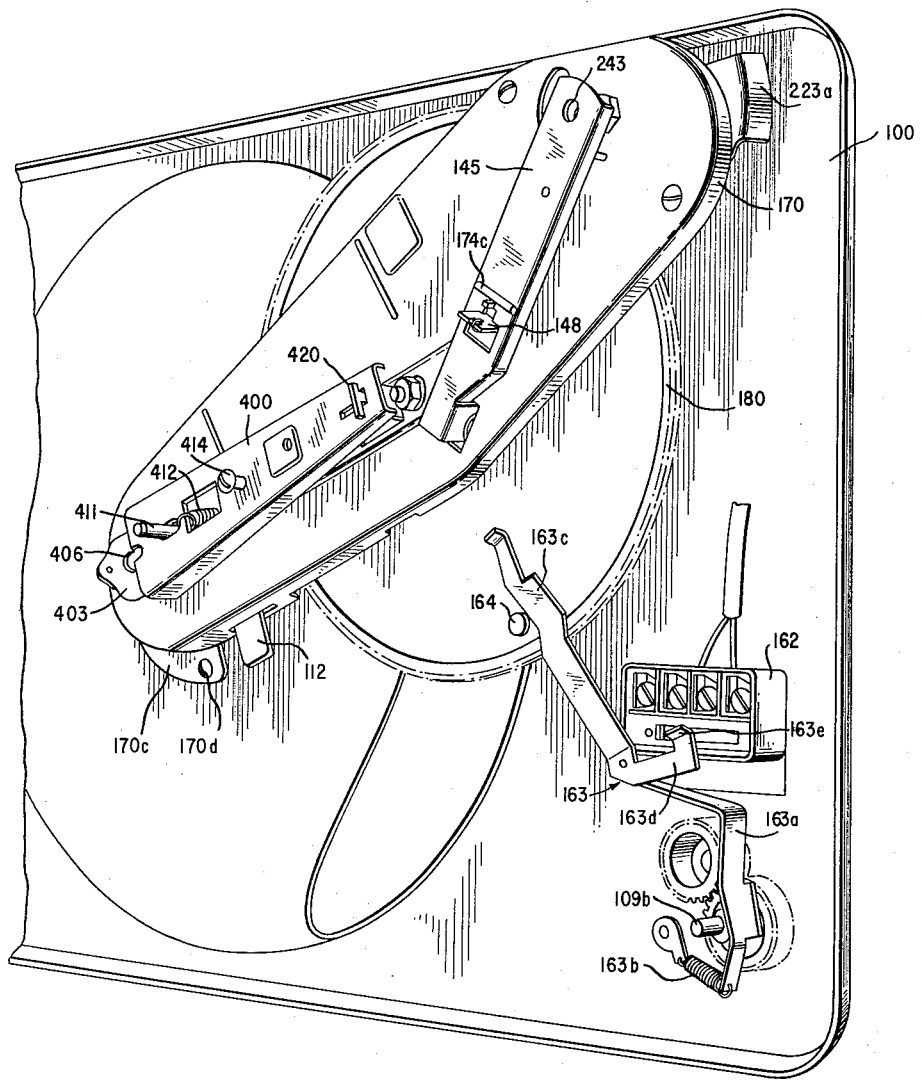
Figure 23:
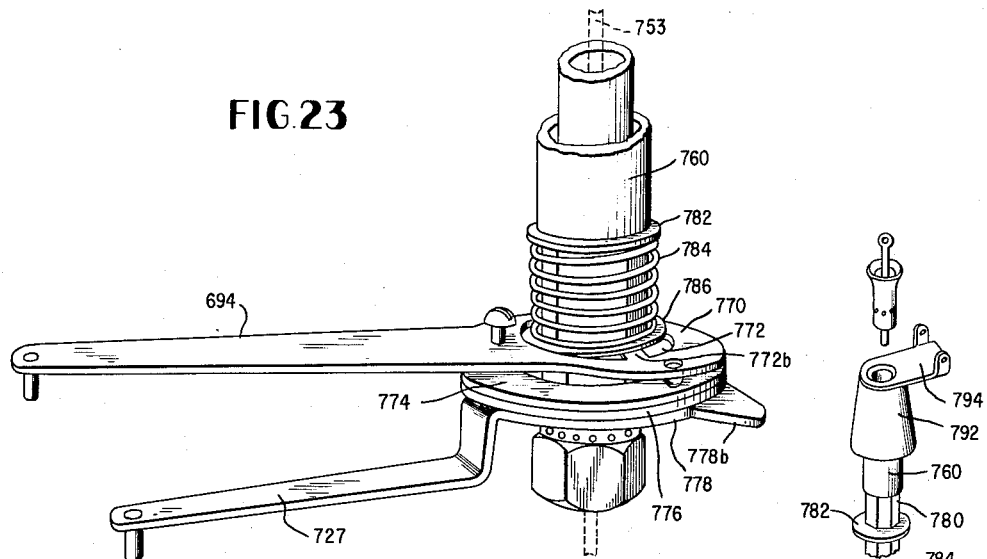
Figure 22:
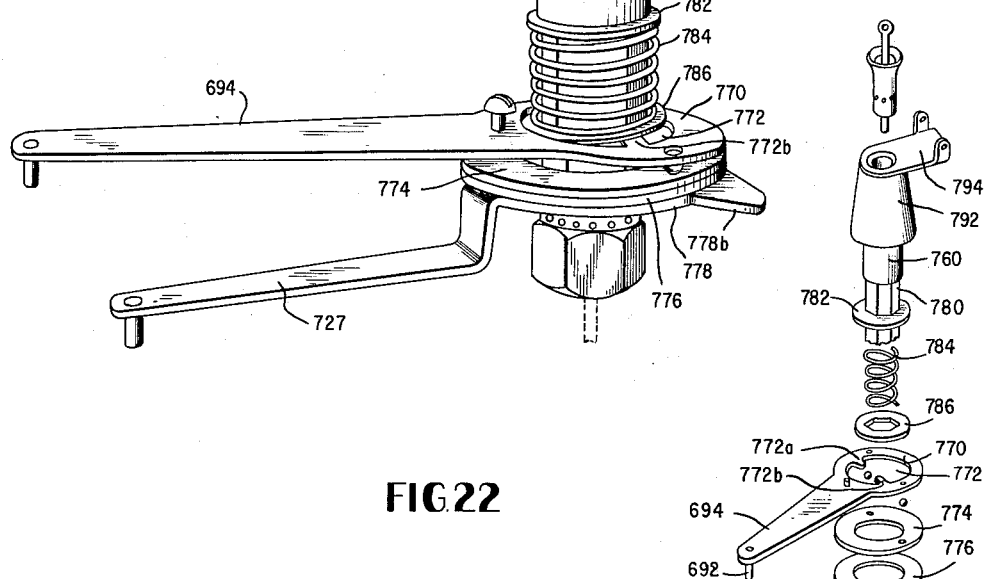

The invention will now be further described with reference to the accompanying drawings, in which:

FIGURE 1 is a general perspective view of a phonograph according to the invention, FIGURE 2 is a general perspective view of the phonograph shown in FIGURE 1 with the base removed, FIGURE 3 is a section through a detail of the phonograph showing the motor speed selector and push button starter arrangement, FIGURE 4 is a section through a part of the phonograph showing one embodiment of the switch arrangement, FIGURE 5 is a perspective view of the phonograph shown in FIGURES 1 and 2, seen from the bottom, FIGURE 6 is an exploded, perspective view of the tone arm support, FIGURE 7 is a perspective view of the sub-assembly, including the control mechanism for moving the tone arm, FIGURE 8 is a perspective view of the same sub-assembly with the cycling cam removed, FIGURE 9 is a perspective view of the sub-assembly with the driving gear for the cycling cam and the tone arm spindle together with the cam track follower arm removed, FIGURE 10 is a perspective view of the sub-assembly shown in FIGURES 8 and 9, seen from the bottom, FIGURE 11 is an exploded view of the sub-assembly shown in FIGURE 10, FIGURE 12 is a general exploded view of the sub-assembly shown in FIGURES 7–9, FIGURE 13 is a general cross section through a phonograph according to the invention, FIGURE 14 is a longitudinal section through the center spindle of the phonograph and appertaining parts of the phonograph with the parts in one position, FIGURE 15 is a section of the center spindle shown in FIGURE 14 with the parts in another position, FIGURE 16 is a section of the center spindle shown in FIGURE 14 with the parts in a third position, FIGURE 17 is an exploded view of the parts of the center spindle, FIGURE 18 is a perspective view of some parts of the center spindle, FIGURE 19 is a perspective view of other parts of the center spindle, FIGURE 20 is a general perspective view of a modified embodiment of the phonograph according to the invention, FIGURE 21 is a schematic view of the main parts of the phonograph shown in FIGURE 20 with the exception of the details of the cam disc and the trip starter, FIGURE 22 is a schematic, perspective view of a bridge plate illustrating the trip starter arrangement, FIGURE 23 is a perspective view of the lower part of the tone arm spindle assembled from the parts shown in exploded view in FIGURE 22, and FIGURE 24 is a section through a part of the drop control mechanism according to a modified embodiment.

According to the invention I provide a phonograph having a center spindle for supporting a stack of records to be supplied one by one to the turntable.

The center spindle includes a drop control mechanism comprising means operable to engage the center hole of the lowest record in the stack. By such engagement the record is positively clamped and after the clamping has been caused the record is pulled downwardly to a position in which it is isolated from the remaining records.

By means of the clamping and the down pull of the record I obtain a safe and controlled movement of the lowest record of the stack as a part of its drop. The record is firmly held and guided in a horizontal plane during its movement to its isolated position.

In the isolated position the size of the record is gauged by a feeler member, preferably the tonearm, which is caused to move from an exterior position inwardly to engage the edge of the record firmly held in its isolated position. The clamping and thereby the stabilization of the record is an improvement and increases the safety of the feeling operation because the record is held in such a stabilized position that the feeler member will always engage the edge of the record.

Furthermore the clamping of the record and its positive pull downwardly enable certain advantages with respect to the change cycle.

The change cycle involves, in addition, the supply of the lowest record from the stack to the playing position on the turntable, different movements of the tonearm including the gauging of the size of the record. Before the gauging of the size of the record the tonearm is lifted from the record which has been played before and moved out to an exterior position. Thereafter the tonearm, or if a separate feeler member is used, the feeler member is moved inwards to engage the edge of the record. Thereafter the tonearm or feeler member respectively is moved out to be disengaged from the edge of the record to allow its free drop to the turntable and after that the tonearm is again moved inwards to be lowered to engage its stylus with the initial sound groove of the record in the start-of-play position thereof.

The time available for carrying out the various movements during the change cycle is limited and according to present-day requirements, should not exceed 9–10 seconds. If the gauging of the size of the record fails, i.e. if the feeler member does not engage the edge of the record the mechanism fails to operate correctly. It is therefore important that the record is in the position in which it can be engaged by the feeler member before the latter moves inwards. If the record is allowed to drop freely to its isolated position it must be taken into consideration when planning the time allowed for the different movements that a light-weight record under circumstances can remain "hanging" under the stack.

The present invention avoids this drawback by positively pulling the record down to its isolated position whereby the time for the gauging movement can be decreased which either can be used for decreasing the entire change cycle time or improving the timed relationship between some other movements.

Furthermore a downward pull of the record when engaged by clamping means is a gentle handling of the record because it avoids interruption of the free drop which can cause damage on the record.

In a more specific aspect of my invention the phonograph has a center spindle for supporting a stack of records to be supplied one by one to the turntable.

The center spindle includes drop control means having at least one member operable to expand in the center hole of the lowest record of the stack to hold the record. While in the expanded position the member is movable downwards holding the record to isolate it from the remaining records of the stack. In this position the size of the record is gauged and after the gauging the record is eventually allowed to be released and dropped to the turntable.

In a still more specific aspect of my invention I provide a phonograph having a turntable mounted for rotation and a record supporting spindle extending substantially perpendicular to the plane of the turntable. The spindle has at least one upwardly facing shoulder for supporting a stack of records and means for controlling the supply of the records one by one to be dropped to the turntable for being played.

The drop control means comprises means for engaging the center hole of the lowest record in the stack supported on the center spindle. A tonearm is mounted adjacent the turntable and is operable to be moved in a path to engage the edge of the record before it is allowed to drop freely to the turntable for measuring the size of the next record to be played.

The phonograph further has means operable after playing of a record for swinging the tonearm outwardly and thereafter actuating the record engaging means to clamp the lowest record in the stack and move the record downwards to isolate it from the remaining part of the stack. Therefore the record size gauging means operates to measure the size of the record in its isolated position. By such engagement the tonearm movement control mechanism is influenced to select the end position of the travel path of the tonearm during the change cycle to respond to start-of-play position of the record measured.

Furthermore means is provided for controlling the drop of the record to the turntable after the size has been measured in the isolated position and thereafter the tonearm is moved inwardly to its initial position to play the record.

In still more specific terms I provide a record changing phonograph having a center spindle for supporting a stack of records to be supplied one by one to the turntable.

The center spindle has an upwardly facing shoulder for engaging the underside of the lowest record in the stack in a position in which the center hole of the record is eccentrically displaced relatively to the lower portion of the center spindle.

The spindle includes a mechanism having a drop control member comprising an upwardly facing shoulder and an outwardly facing surface above the upwardly facing shoulder. The drop control member is movable in a cycle which first comprises swinging the member to engage the outwardly facing shoulder against the center hole of the record. The record is thereby displaced sidewardly so as go to bring its center hole into alignment with the lower portion of the center spindle below the supporting shoulder thereof. Simultaneously the record is clamped between the outwardly facing surface of the drop control member and a member on the surface of the spindle opposite the supporting shoulder thereof. The latter member is slidably arranged along a surface portion of the spindle and the drop control member is movable for being lowered in the axial direction of the spindle so that the record clamped will be pulled down along the spindle. When the drop control member has passed through its stroke it is caused to be retracted in the center spindle preferably by an inclined cam surface below the supporting shoulder which engages an end of a slot through which a part of the drop control member projects.

Now with reference to the drawings the magazine phonograph according to the invention comprises a base plate or chassis 100 (FIGURE 1), a tone arm 150 having a pickup head 151 including stylus means and a center spindle 111 for supporting a stack of records to be released successively from a support on said center spindle to be fed down to the playing position on the turntable 105. The turntable 105 is driven by a motor 101 comprising a gear and suitable driving means such as a pulley 102 as most clearly shown in FIGURE 2.

The motor and the driving arrangement do not form part of this invention and will therefore not be described in any further detail. A suitable embodiment of the driving arrangement may, however, be as described in my U. K. Patent No. 757,378 (FIGURE 11 of my U.S. patent application Serial Number 225,946).

In the case that the gear included in the driving arrangement for the turntable can be set at a slow speed such as 16⅔ r.p.m., means are preferably included in the gear arrangement for obtaining a constant time interval during the change cycle irrespective of the speed at which the tunrtable is set, for example in the manner disclosed in my copending U. K. patent application 16,090/56.

The selection of the gear and thereby setting of the desired speed of the turntable is made by a control knob 153.

In a preferred embodiment I combine the selector knob 153 with a starter control knob 108 which by being pressed down as a push button will serve to start the phonograph and, as it will appear from the following description, also can serve as rejector control in the event that a record should be rejected, and furthermore can serve as a control member for the phonograph when being used as an automatic single player, and finally can serve as stop control member.

The speed selector knob 153 (FIGURE 3) has a central bore, the lower end of which fits on a bushing 154 secured to the chassis plate 100. The bushing as well as the bore has aligning annular grooves in which a locking spring 155 engages so as to lock the selector knob 153 in position.

The top end of the bore of the selector knob 153 is of polygonal interior cross section so as to slidably receive the top end of the control knob 108 which has a corresponding exterior polygonal cross section. The knob 108 has a cylindrical portion that extends down through the bushing 154. It will thus be understood that the selector knob 153 can be turned by turning the starter knob 108 and that the starter knob 108 in any position of the selector knob can be pressed down to start the phonograph. At the lower end of the portion 108a the starter knob is provided with a member 109 which in the present embodiment is in the form of an inverted cone, the upper end of which at the periphery of its base is formed like a pinion 109a which engages in another pinion 112 mounted for rotation and through suitable clutch means 113 connected with a suitable rotatable control shaft for the selection of the various speeds.

According to the present embodiment the switch for the phonograph motor included in the circuit thereof is arranged on the base plate 100 and is adapted to be opened by the weight of the tone arm when the latter is lowered on the switch. The switch comprises a switch member 162 (FIGURE 4) having a post 160 extending above the top of the chassis. The switch body 162 is in the form of an insulating body below which there is arranged a leaf spring having a magnetic armature to be either attracted by a small permanent magnet to close the switch, or to be disengaged therefrom when the weight of the tone arm presses down a control member 161 so as to open the switch. It will be understood that any other switch arrangement can be used within the scope of the invention such as for example switches of the so-called "frog"-type commonly known in the trade as microswitches.

Another possible switch arrangement within the scope of my invention may be as shown in my copending U. K. patent application 30,456/56, to which cross reference is hereby made. The switch arrangement as such does not form part of the present invention and will not be referred to in greater detail.

At one corner of the insulating switch body 162 a swingingly arranged arm, generally referred to by reference numeral 163, is arranged as most clearly shown in FIGURE 5. This arm has one extension 163a, and the end of this arm is under influence of a spring 163b kept in engagement with a pin 109b which extends below the conical surface of the member 109. The arm has a further extension 163c which extends below the cycling cam disc for the control mechanism that moves the tone arm. Further the arm includes an extension 163d, which with an inclined portion 163e extends over the undersurface of the switch body through which the control member 161 extends in the form of a rod the lower end of which extends below the switch body when the member 161 is pressed down by means of the weight of the tone arm.

When the control knob 108 is pressed down, the conical surface of the member 109 will engage the portion 163a of the arm 163 and thereby swing the arm in clockwise direction against the action of the spring 163b to the position shown in FIGURE 5. This will cause the portion 163c of the arm to engage an abutment 164 on the cam disc to give the latter a push so as to start the cycle of movements; simultaneously the sloping portion 163e of the arm portion 163d will pass the extending lower end of the control member 161 and thereby cause the same to be lifted to close the switch. This is a safeguard in the event that the switch control member for some unforeseen reason should not be lifted under influence of the action of the switch spring.

Referring more specifically to FIGURES 7–12, the mechanism for controlling the movements of the tone arm is mounted on a supporting bridge member generally designated by reference numeral 170 which in the embodiment shown is in the form of a bridge member adapted to be secured below the chassis 100. The bridge has a bottom 172 and an upwardly extending flange or rim 170a along its periphery. At the left hand end of the bridge this arm is at 170b of increased height and terminates in a horizontal flange 170c extending in a plane substantially parallel with the bottom of the bridge and having a pair of screw holes or the like 170d for fastening this end of the bridge to the chassis plate 100 by means of screws or other suitable fastening means. At the other end of the bridge a pair of posts 175a and 175b are secured to the bottom of the bridge extending vertically therefrom, their top ends being provided with screw holes for receiving another pair of screws to fasten this end of the bridge under the chassis plate.

At the left hand end of the bridge the bottom 172 is provided with a depression or cavity 171 at the bottom of which there is rigidly secured a hollow spindle 182 which forms a stationary spindle for the turntable 105 and in the longitudinal hollow bore of which the lower end of the center spindle 111 is received. The lower end of the spindle 182 is surrounded by suitable ball bearing means 182a which are received in the cavity 171 and adapted to support the center bushing 105a of the turntable 105. The length of the hollow spindle 182 is so adapted to the length of the turntable bushing 105a that the top 182 of the spindle preferably extends sufficiently above the surface of the turntable to enable a single record to be supported on the turntable to be centered when the phonograph is used as a single player in a manner to be more fully described.

It will be understood that the exterior diameter of the hollow spindle 182 should be approximately the same as the exterior diameter of the lower end of the centre spindle 111 which by means of a downwardly facing shoulder is supported on the top of the hollow spindle 182 and has a portion of reduced diameter which extends through the bore of the spindle 182 with suitable control means for the center spindle extending below the bridge and adapted to be engaged by a record drop control mechanism in the event that the phonograph is of the center drop control type. This term implies a record changing phonograph in which the center spindle is adapted to support a stack of records and includes a mechanism for feeding the lowest record in said stack sequentially from the supporting means on the center spindle to the turntable and in which the phonograph has actuating means for said mechanism included in the center spindle.

It will be understood, however, that my invention is not limited to this specific type of phonographs and that also edge drop control may be used within the scope of my invention. The term "edge drop control" implies a phonograph of the type having a stationary rigid center spindle including an upwardly facing shoulder and control means for engaging the edge of the lowest record in the stack supported on said shoulder to give it a sideward push to disengage it from said shoulder to allow it to descend along the center spindle.

In the embodiment shown a gear wheel 107 (FIGURES 12 and 13) such as a pinion is secured to the center bushing 105a of the turntable adjacent the lower end thereof for the purpose of driving the control mechanism for the phonograph during the change cycle.

The basic member of the control mechanism for the tone arm, i.e. the "heart" of the phonograph according to the invention is the cycling cam or cam disc generally referred to by reference numeral 180 in the form of a flat disc having a toothed periphery and mounted for rotation on a pin or shaft 181 which as shown may be in the form of a bolt that extends down through a hole 181a (FIGURE 11) in the bottom plate 172 of the bridge and is secured to the bridge by means of a nut 181b (FIGURE 13).

An intermediate gear wheel 119 is arranged between the periphery of the cam disc 180 and the pinion 107 on the turntable bushing 105b so as to drive the cam disc from the continuously rotating turntable spindle during the change cycle. The gear wheel 119 is arranged for rotation on a pin 119a rigidly secured to a supporting member 112. The intermediate gear wheel 119 may be locked on the pin 119a by suitable means such as a spring washer engaging in an annular groove at the top end of the pin 119a. As seen most clearly from the exploded view in FIGURE 12 the member 112 is at one end formed with a hook 112a which is adapted to be received in a slot 112b in the portion 170e of the flange of the bridge 170 which is slightly higher than the remaining part of said flange. The slot 112b substantially aligns with the top surface of the flange 170a so that the body portion of the member 112 will be supported at 170f on the top of the flange 170a. The other end of the member 112 is adapted to be received in a slot 170g in another portion 170h of the flange 170a which also is slightly higher than the remaining part of the flange. Also the slot 170h substantially aligns with the edge of the flange 170a. The supporting pin 119a for the intermediate gear wheel 119 is so located in offset relationship relative to the connecting line between the center of the turntable spindle and the shaft of the cam disc that a spring 177 interposed between the member 112 and the front edge of the bridge 170 will tend to pull the member 112 forwardly in the views shown in FIGURES 7–12 so as to thereby bring the intermediate gear wheel 119 to engage against the driving wheel 107 as well as against the periphery of the cam disc 180 and wedge the gear wheel 119 in this engaging position to secure safe engagement. The slot 170g is of sufficient extension to allow the member 112 to swing slightly so as to disengage the intermediate gear wheel 119 from the gear wheel 107 when the gear wheel 119 falls in a recess 183 provided in the periphery of the cam disc 180.

In broad terms the control mechanism for moving the tone arm comprises two sets of cam portions of the cam disc, one set of cam portions controls the horizontal movement of the tone arm through a cam track follower arm 231 provided with a cam track follower pin 136, and the other set of cam configurations tilts a lever 145 (FIGURES 5, 11 and 13) secured below the bottom of the bridge. The control mechanism further includes a trip starter arrangement for controlling initiation of the movement of the cam disc which during the change cycle will make one complete revolution.

All the parts referred to hereinabove with the exception of the cam disc, are standardized parts which are designed in such a manner that they can be used in different models of the phonograph which models only differ therein that they only need to comprise different cam discs.

The tone arm spindle subassembly comprises as most clearly illustrated in the exploded view, FIGURE 12, a hollow spindle 260 the lower end of which is secured to the bridge 170 by means of two nuts 262 and 263. The top end of the hollow spindle is bent outwardly to form a collar 261. Th spindle 260 is surrounded by an exterior hollow spindle 267 having an interior diameter which is slightly larger than the exterior diameter of the spindle 260. The spindle 267 extends vertically between the collar 261 and the nut 263. Between the top end of the spindle 267 and the collar 261 balls are inserted to form a ball bearing. In a similar manner a ball bearing is formed between the lower end of the spindle and the nut 263. This subassembly further includes a disc 220 having an extending arm 221 and rigidly secured to the exterior spindle 267 for example by crimping. The exterior dimension of this disc is so that it can rotate between the two posts 175a and 175b when the tone arm spindle assembly is mounted in the hole 265 in the bottom of the bridge. Rotation in the counterclockwise direction is limited by means of an abutment 222 while rotation in the clockwise direction is limited by an abutment 223 which, however, does not come into engagement with the post 175b when the phonograph is used as a record changing phonograph. The abutment 223 has an upwardly extending cylindrical flange 223a substantially concentric with the tone arm spindle for such purposes in connection with the use of the phonograph as an automatic single player which will be described later on.

Below the disc 220 another disc 230 is arranged having a center hole which fits on the tone arm spindle 267 so as to allow this disc to swing on the spindle. The disc 230 has a sidewardly extending arm 231 the exterior end of which is provided with an upwardly extending flap that terminates in a bent-over flap 233 substantially parallel with the arm 231. Aligning holes 234 are provided at the end of the arm 231 and the bent-over flap 233 for guiding a cam track follower pin 136 which is movable in a direction perpendicular to the plane of the cam disc against the action of a spring 137 one end of which is wound tightly to clamp itself on the pin 136. The upper end of said spring 137 abuts against the underside of the flap 233. A pair of friction washers 230a are arranged at each side of the disc 230. The upper washer lies between the disc 220 and the disc 230, and the lower washer lies between the disc 230 and another disc 227 which is arranged on the spindle 267. The disc 227 has a center hole of slightly larger diameter than the exterior diameter of the spindle 267. At the periphery of the disc 227 there are provided two upwardly extending flaps 228a and 228b, each of which is provided with a pair of opposing notches. Furthermore the disc 227 has a downwardly extending portion 238 which continues in a horizontal arm 239, which, when the tone arm spindle assembly is mounted on the bridge can swing with the tone arm and actuate the trip starter mechanism. For this reason the arm 239 will be referred to hereinafter as the trip starter actuating lever.

Some of the parts just described form a friction link that will allow the arm 231 to swing on the tone arm spindle against friction. In order to provide for the friction an elongated, curved leaf spring washer 216 is provided having portions for engaging the notches of the flaps 228a and b so as to press the parts together. In more detail the curved spring 216 has an oval center hole opposite one end of which there is provided a notch 217 in the periphery adapted to fit in the pair of opposing notches of the flap 228a. Opposite the notch 217 there is within the periphery of the spring 216 provided a T-shaped aperture which has an interior portion that is broad enough to allow the other flap 228b to pass up through said portion and an exterior narrow portion of substantially the same width as the notch 217 so as to allow it to engage in the pair of opposing notches of the flap 228b.

The parts of the tone arm spindle sub-assembly are put together in the following manner:

The tone arm support as shown in FIGURE 6 comprises a body 253 having a longitudinal bore 254 which fits on the tone arm spindle 267. A bracket 257 having two downwardly extending flaps 257a and 257b is secured to the top of the body 253, for example by means of the pin 266 passing through a transverse hole 265 in the body 253. The rear end of the tone arm defines a cavity in the interior of which the bracket 257 is secured by means of a screw 249 passing down through a hole and secured in a screw hole 249a in a pin 251 on the bracket 257 by means of a pin. The control of the vertical movement of the tone arm is obtained by a rod 240, the top end of which at 241 is U-bent with its branches passing through a pair of holes in the bracket 257. The rod 240 extends down through the interior tube 260 of the hollow tone arm spindle and through a hole 243 in the lever 245. Below this lever a nut 242 (FIGURE 13) is adjustably connected with the rod 240, for example by screw threads.

In order to clamp the tone arm safely on the spindle 267 so as to prevent it from being turned relatively thereto during the operation of the phonograph the member 253 may as shown in FIGURE 6 be slotted at 254a adjacent the hollow bore 254 so that a screw 255 passing through the member can cause the same to be clamped firmly on the spindle 267.

The lever 145 (FIGURES 11 and 13) controlling the vertical movement of the tone arm is pivotally arranged on a post 173 preferably formed by a pressed-up flap stamped out of the bottom of the bridge. This flap engages in a recess 174 defined by a depression in the lever 145 so as to define a pivot therefor.

At the end remote from the hole 243 (FIGURE 11)

the lever 145 has an upwardly extending flap 146 the top of which is slotted to receive a rotatable roller 147 for engaging that part of the control cam of the cam disc that serves to control the vertical movement of the tone arm. In order to keep the roller 147 in firm engagement with that portion of the cam disc a spring 148 is interposed between the bottom of the bridge and the lever 145 between that end thereof which carries the roller 147 and the pivot point.

The trip starter assembly comprises two arms which are frictionally connected, and the front end of which is adapted to be engaged by a nose on the rotating turntable spindle which causes one arm to reciprocate and thereby control initiating of movement of the cam disc.

More specifically the trip starter comprises two levers 210 and 236 (FIGURE 12) both arranged on the bridge below the cam disc. These arms are carried by a pin 300 on which the lower arm 236 is swingingly arranged bearing against a pair of ribs 202 and 206 at each side of the pin 300. Above the arm 236 the pin 300 has an annular groove 301 capable of receiving a keyhole-like aperture 211 in the lever 210 which by means of a pair of ribs 203 and 205 bears against the top surface of the lever 236. Between a flap 204 adjacent the broad end of the keyhole-like aperture 211 in the pin 300 a spring 214 is interposed serving to keep the lever 210 in its farthest projecting position with the narrow end of the keyhole 211 engaging in the groove 301 of the pin 300. Adjacent its front end the lever 236 has a pair of upwardly bent flaps 236a and 236b to limit the mutual angular movement between the two levers.

As seen in FIGURES 9 and 12 the rear end of the lever 236 has a vertical flap 236c capable of being engaged by the trip starter actuating lever 239 which extends from the tone arm spindle assembly so as to swing the trip starter lever assembly counterclockwise to a position in which the front end of the lever 211 can be engaged by the rotating nose 212 on the tone arm spindle which will cause the lever 210 to reciprocate against the action of the spring 214 whereby the arm slides on the pin 300 by means of the narrow portion of the keyhole-like aperture 211.

The record drop control mechanism for actuating the record drop control means included in the center spindle is arranged below the bridge 170. This mechanism comprises a drop control arm mounted for reciprocable movement as well as for being titled and is generally designated by reference numeral 400 (FIGURES 11 and 13). The front end of the arm 400, i.e. the end adapted to engage in the recess at the lower end of the control rod of the center spindle 111 is provided with two edges forming an acute angle and merging in a semi-circular recess 406 which is adapted to engage in an annular groove of a control rod 409 extending below the bridge 170.

The drop control arm 400 is adjacent its right hand end supported on a flap 420 which extends substantially vertically below the bridge and is formed by a pressed-up portion of the material of the bridge. This flap 420 has opposing edge slots capable of engaging in the board end of a U-shaped aperture 408 in the arm 400 so as to allow the same to move in longitudinal direction. The arm 400 is further guided by means of an elongated slot 410 on a pin 411 which is secured to and extends downwards from the bridge 170. Between the arm 400 and the bridge a spring 412 is interposed extending at an inclined direction so that it will normally tend to keep the arm 400 in the retracted and raised position with the left hand end engaging the underside of a plate member 403 secured below the cavity of the bridge and forming a guide for the arm 400 as well as a stiffening member. On the top side of the arm 400 a cam surface 414 is provided preferably adjustable in height by means of the screw 414a.

In order to move the arm 400 to the left so as to engage the recess 406 into an annular groove 409a in the center spindle control rod 409 and to swing the arm 400 with its left hand end downwards after such engagement, a control member 450 is provided mounted for reciprocable movement and adapted to be moved by a suitable cam portion 480 on the underside of the cam disc, see FIGURES 8 and 11.

The member 450 has a main body portion 452 which is adapted to slide on the top of the bridge 170 movable in an elongated depression 453 thereof so that the top portion of the part 452 will be substantially in alignment with the top surface of the bottom of the bridge 170. On the top of the body portion 452 a roller 455 or the like is mounted to be engaged by the came portion 480. A part 456 of the member 450 is bent downwardly and extends down through an elongated slot 424 in the bridge as shown in FIGURES 8, 10 and 11.

The part 456 of the member 450 which extends below the bridge has two opposing and slightly offset arranged slots 458 and 460 respectively in each of which a pair of duplex rollers 459 and 461 is inserted. These rollers are so dimensioned that they will be able to roll on each other and simultaneously therewith the top roller will run along the under-surface of the bridge, while the lower roller 461 runs along the cam 414.

The cam disc 180 adapted for the embodiment according to FIGURES 7–12 has the following track portions for controlling the horizontal movement of the tone arm:

As already mentioned the cam disc 180 is arrested during playing of a record in that position in which the intermediate gear wheel 119 falls into the recess 183 provided in the periphery of the cam disc and thereby disengages the gear wheel 119 from the gear wheel 107 on the turntable center bushing. In this position the cam track follower pin 136 is allowed to swing freely in a recess 198, not only through such an angle which corresponds to its swinging during playing of a record of the largest size to be played, but through an angle which can bring the cam track follower pin 136 out to a position adjacent the periphery of the cam disc corresponding to the stop position in which the tone arm is lowered onto the switch post. The recess 198 has an extension 198a the bottom of which as well as the bottom of the recess 198 is so far below the lower end of the cam track follower pin 136 that the end of the pin will not touch the bottom of either of these recesses when the tone arm swings. At the termination of the etxension 198a it has an upwardly sloping portion 198c which terminates in an end wall 198b of the recess 198a. The end wall 198b extends into an outwardly leading track 189 which terminates adjacent the edge of the cam disc. This track has steep side walls and a bottom which is at a level so much higher than the bottom of the recess 198 and 198a that the cam track follower pin 136 will engage the bottom of this track 189 during the passage therein.

The exterior end of the outwardly leading track 189 continues into an inwardly leading track 191 which in the following will be referred to as the test track for the embodiment in question. The radial distance between the exterior end of the test track 191 and the interior end thereof is so related to the path of an abutment 151a (FIGURE 1) on the tone arm when moved under the control of the cam track follower pin 136 in this track 191 that this abutment 151a when moved through this path will be able to engage the edge of a record of any size to be played before the cam track follower pin 136 arrives at the interior edge corner 191a of the track 191. In order to regulate the position of this corner 191a the exterior limit of the track 191 may be adjusted by means of a plate 185 swingingly secured to the top side of the cam disc about a rivet or the like 185a and adapted to be fastened in the adjusted position by means of a screw 185b which can pass in an elongated slot in the plate 185.

An outwardly leading curved track 193 starts from the corner 191a and is capable of leading the cam track follower pin 136 outwards. The wall of this track along the convex side is steep so as to prevent the cam track follower pin 136 from climbing this wall while the wall on the concave side is sloping so as to make it possible for the cam track follower pin 136 to climb the sloping wall portion to move upon the surface of the cam disc and thereby travel across to a track 194 which is curved in the opposite direction to the track 193 and inwardly leading. Along the concave side thereof, the track 194 has a sloping wall portion while its wall portion at the convex side is steep. The track 194 continues into a track 196 which is substantially concentric with the cam disc and which merges into the playing recess 198 at a point where the tone arm will land its stylus means in the correct position on the record tested in the manner which will be more fully described with reference to a description of the mode of operation.

The cam portion for controlling the vertical movement of the tone arm by tilting of the lever 145 comprises a plurality of sections at different levels which pass the roller 147 located at the left hand end of the lever 145 in timed relationship relatively to the horizontal movements of the tone arm. During playing of a record the roller 147 will engage the lowest level of a cam portion 184a and thereby tilt the lever 145 to an extent that the nut 242 will be entirely disengaged from the right hand end of said lever and thereby allow the tone arm to be lowered and to rest the stylus on a record supported on the turntable. When the cam disc 180 has been started by means of the trip starter the lowest section 184a immediately passes away from engagement with the roller 147 whereby the lever 145 under influence of the spring 148 is tilted so as to cause the roller 147 to pass to the next section 184b which is connected with the section 184a by a sloping portion.

This section 184b is at a slightly higher level so that the tone arm is raised. This raising takes place immediately after the cam disc 180 has been started and in any event before the cam track follower pin 136 is engaged by the end wall 198b of the recess 198a during the rotation of the cam disc in the direction of the arrow shown in FIGURES 7 and 12. The cam section 184b remains in engagement with the roller 147 to retain the tone arm in an intermediate raised position until the cam track follower pin 136 has reached its exterior position at the end of the outwardly leading track 189.

In this position a further sloping portion causes the roller 147 to engage against a portion 184c which is at a still higher level so as to raise the tone arm to its topmost position in which it remains during the inward movement of the cam track follower pin 136 in the track 191 as well as at least during a part of the outward movement in the track 193. Thereafter a further sloping portion causes the roller 147 to engage a subsequent portion 184d substantially at the same level as the portion 184b. Before the cam track follower pin 136 arrives at the point of connection between the tracks 194 and 196 a further sloping portion causes the roller 147 to be pressed down to re-engage the portion 184a, thus allowing the tone arm to be lowered. This position is reached when the cam track follower pin 136 enters the track 196 so that the tone arm is lowered to engage its stylus against the record during the last part of the cycle, when the cam track follower pin 136 is guided in the track 196. The width of this track 196 may be slightly broader than the width of the other tracks so as to allow the cam track follower pin 136, to move with a slight play during the passage of this track 196 in the inward direction to assure that the stylus is brought into safe engagement with the initial sound groove of the record.

In order to actuate the drop control mechanism described hereinabove the cam disc 180 has a further cam portion 480 defining a plurality of eccentric portions of different radial extensions. This cam portion 480 surrounds the center of the cam disc and is at a plane below the cam portion which controls the vertical movements of the tone arm. The configuration of this cam portion and its position relatively to the drop control mechanism is shown in FIGURES 8 and 11. In the position of rest of the cam disc during playing of a record the drop control mechanism is in inoperative position with the arm 400 retracted as well as pulled upwardly by means of the spring 412; the reciprocating slide member 450 is pushed back thereby so that the roller 455 engages a portion of the cam member at 481 which has the smallest diameter. Thereafter follows an eccentric portion 481a of increasing diameter which will bring the drop control mechanism to an intermediate position. A concentric portion 481b will retain the drop control mechanism in this intermediate position for a purpose to be more fully understood in connection with the description of the center spindle. The diameter increases further to a portion 481c which has the larger diameter so as to bring the drop control mechanism fully forwardly and downwardly pulled to drop the record, whereafter an eccentric portion 481d of decreasing diameter brings the drop control mechanism back to its position of rest.

The record drop control mechanism will now be described with reference to FIGURES 14–19. It will be appreciated that the specific embodiment of the center spindle illustrated in these figures necessitates means for retaining the stack of records in a horizontal plane such as in the form of a ballast arm arranged to be raised and swung in over the stack of records to be lowered into engagement with the top surface of the stack of records for stabilizing the latter. Such ballast arm is not shown in connection with the above described embodiment but is well known to those skilled in the art.

The center spindle is in the form of a cylindrical rod 500 the lower end of which is supposed to be secured in the hollow turntable spindle 182. An upwardly facing shoulder 502 (FIGURES 17 to 19) is provided on rod 500 for engaging the underside of the lowest record in a stack in a position in which the center hole of the record is eccentrically displaced relatively to the lower portion of the center spindle, i.e. below the shoulder 502.

In the specific embodiment of the center spindle described the shoulder 502 is formed by means of a recess or cut-away portion 504 which extends from one side of the center spindle rod 500. The outwardly facing surface of the recess 504 has a lower portion 506 which is substantially vertical and an upper inclined portion 508.

The center spindle is provided with an elongated longitudinal slot 510 which extends in the axial direction of the spindle from the side thereof opposite the shoulder 502 and to the top of the spindle terminating at 510a. The slot 510 projects the whole way through the spindle from slightly below the top of the recess 504 at 510b to a point 510c a predetermined distance below the shoulder 502 but preferably somewhat above the point 510a.

In the upper end of the slot 510 there is arranged a member 512 which has a downwardly sloping inclined surface 514 extending outside the periphery of the top portion of the spindle substantially parallel with the sloping portion 508 of recess 504. The member 514 has a downwardly facing shoulder 516 which is vertically spaced from the upwardly facing record supporting shoulder corresponding substantially to the maximum thickness of a record to be handled.

It will be understood that when a stack of records is deposited on the spindle, the inclination of the surfaces 508 and 514 will cause the lowest or a plurality of the lowest of the records to be sidewardly displaced so that the lowest records will engage the shoulder 502 and cause the whole stack to be supported on the spindle. In order to allow the stack of records to be easily removed without the necessity of removing the spindle from the turntable spindle the member 512 has adjacent its top end a slot 518 through which passes a pin 520 which is secured adjacent the top end of the spindle and extends across the slot 510. A further pin 522 extends through the slots and is engaged by the inwardly facing surface of the member 512 so as to keep it in the position shown in FIGURES 14, 15 and 16 from which it will be understood that when a stack of records which has been dropped to the turntable is lifted, the top surface of the top record of the stack will push the member 512 upwardly against gravity so as to enable the whole stack to be removed.

The center spindle includes a drop control mechanism the parts of which are shown most clearly in the exploded view of FIGURE 17. This mechanism includes an elongated arm 524 which has an upwardly facing shoulder 526 for engaging the underside of the lowest record in the stack. The arm 524 is in a manner to be more fully explained hereinafter movable in axial direction in the center spindle and retractable to the interior of the spindle after having moved through its stroke during which the lowest record is supported on the shoulder 526. The mechanism further includes a radially movable surface 528 which in the embodiment shown is an outwardly facing surface on the drop control member 524 above the shoulder 526.

The drop control member 524 is associated with a member generally referred to by reference numeral 530. This member is of U-shaped cross-section with side walls 532 and 534 and is mounted to surround the sides of the drop control member 524 so as to allow this member to tilt or swing in a manner to be more fully described in connection with the description of the mode of operation. The member 530 further has a front wall 536 with a downwardly extending projection 536a. The member 530 slides axially in the center spindle together with the drop control member 524 and is secured thereto in a manner which allows the drop control member to tilt the member 530 which allows the drop control member to tilt, the member 530 itself being axially guided without tilting. The member 530 may for example be of such a length that its lower end is guided in the tubular part of the spindle 500 below the edge 510a at the end of the slot 510. To ensure that the member 530 participates in the axial movement of the drop control member 524 the member 530 may be connected with the member 524 for example by spot welding at 536b at the lower end of the extension 536a.

The member 530 has a pair of oppositely extending flaps or ears 538, 540 sliding along a portion 542 of the center spindle diametrically opposite the recess 504. This portion is of reduced thickness, that is, flattened at 542a, 542b at both sides of the recess 510.

The upper end of the front wall 536 of the member 530 is slotted at 536a to provide passage for an inclined cam surface 529 on the drop control member 524 below the record supporting shoulder 526.

The lower end of the drop control member 524 extends below the lower end of the spindle 500 and is influenced by a spring 544 which serves to keep the drop control member 524 in the tilted position shown in FIGURE 14 in which the top 527 extends through the slot 510 and lies substantially below the downwardly facing shoulder 516 of the member 512 so as to prevent the lowest record in the stack from being sidewardly displaced on the upwardly facing supporting shoulder 502. Futhermore the lower end 541 of the drop control member 524 has a notch or the like 546 facing the drop control arm 500 the front end of which is adapted to engage in the notch for controlling the operation of the mechanism in the center spindle.

The mode of operation is as follows:

Assuming that the mechanism has been stopped by means of its own automatic stop action, the cam disc 180 is in the position shown in FIGURE 7. The tone arm is in its most exterior position lowered on the switch post 160 so as to open the switch and the cam track follower pin 136 is located at the exterior end of the recess 198 just where the stop track 195 merges into this recess.

When the starter push button 108 is depressed the conical surface 109a will serve to swing the three-armed lever 163 against the action of the spring 163b. This will cause the portion 163c of this arm to engage the abutment 164 on the underside of the cam disc 180 to give it an initial push sufficient to bring the intermediate gear wheel 119 out of the recess 183 so as to engage it in driving connection between the gear wheel 107 of the turntable bushing and the periphery of the cam disc. Simultaneously the arm portion 163e will, as previously explained, push the switch control rod 161 upwards so as to make sure that the switch is closed. By the initial rotation of the cam disc the tone arm is raised immediately but remains in the exterior position with the cam track follower pin passing in a by-pass track 192 along the periphery of the cam disc to the end of this track, which merges in the inwardly leading track 191 which causes the tone arm to swing inwards.

During this part of the change cycle, the drop control mechanism is actuated in order to prepare for the supply of the lowest record of the stack to the turntable and bring this record to a position isolated from the remaining records, if any, so as to enable its size to be tested during the following inward swinging movement of the tone arm.

During the outward swinging of the tone arm the cam portion 480 engages the roller 455 on the member 450 and pushes this member in the left hand direction as viewed in FIGURE 13. Since the roller pair 461 engages the inclined portion 414 this will cause the arm 400 to move towards the left whereby the end slot 466 of the arm 400 will engage in the recess 546 at the lower end of the drop control member 524. The spring 412 is a relatively strong spring the tension of which is so adapted to the inclination of the inclined surface 414 that when the end of the member 400 engages the notch 546 this will initially cause the drop control member 524 to swing from the position shown in FIGURE 14 to the position shown in FIGURE 15 whereby the lowest record in the stack is pushed sidewardly until its center hole aligns with the center spindle. It will be understood that the member 512 prevents the remaining part of the stack of records to participate in this movement.

This preparation for the drop of the lowest record takes place substantially when the track follower is in the exterior of the tracks 189; during the rotation of the cam disc when the track follower 136 is in its exterior position between the tracks 189 and 191, the slide 450 is pushed by a cam portion of increasing radius of the cam member 480 further in the direction to the left so as to cause the roller pair 461 to move up on the inclined surface 414 to tilt the member 400. It will be understood that a further movement of the member 400 to the left is prevented because in the position shown in FIGURE 15 the outwardly facing clamping surface 528 of the drop control member is in engagement with the interior of the hole in the lowest record of the stack having pushed this record so as to engage the other side of its center hole against the flaps 538, 540.

When, however, the member 400 tilts against the action of the spring 412 the drop control member 524 will be pulled down and with the lowest record clamped pull the record down until it assumes the position shown in FIGURE 16.

This part of the cycle is completed when the track follower enters the track 191. The part of the cam member 480 which controls the drop control mechanism is a cam portion which retains the parts of the drop control mechanism in this position during the inward travel of the tone arm as controlled by the track 191.

The following inward movement of the tone arm will then cause the abutment 151a thereon, which as shown in FIGURE 1 may be in the form of an inwardly extending ring on the head of the tone arm, to engage the edge of the record which now assumes the position shown in FIGURE 16 and is isolated from the remaining records in the stack.

If this is a large record the tone arm will abut against the edge shortly after the cam track follower pin 136 has entered the track 191 and if it is a small record, the tone arm will not abut against the edge until the cam track follower pin is relatively near the interior end of the track 191. Any intermediate sizes of records will be engaged by the tone arm abutment in some intermediate position of the cam track follower pin 136 during its passage through the track 191.

When the edge of the record is engaged, the further inward movement of the tone arm is obviously prevented. The dimensions are so adapted, however, that a record of the smallest size to be played will always be engaged before the cam track follower pin 136 has passed to the corner 191a. When the record is engaged the cam track follower pin will, due to the obstruction of the further inward movement of the tone arm, continue to pass inwards with the result that the arm 321 supporting the cam track follower pin 136 will be swung clockwise relative to the tone arm through an angle that will correspond to the size of a record, i.e. a relatively large angle in case of a large record and a relatively small angle in case of a small record.

When the cam track follwer pin passes beyond the corner 191a outwards in the track 193, the tone arm will be moved outwards and simultaneously slightly lowered as previously explained This outward movement will continue until it is obstructed by the abutment of the projection 222 against the post 175b. The dimensions are so adapted that this abutment will take place when the tone arm is in its most exterior position, i.e. the position in which it is capable of being lowered on the switch post.

It will be understood that in case of a large record having been engaged the tone arm will reach its exterior position when the cam track follower pin 136 has passed a relatively short portion of the track 193 while in case of a small record the abutment 222 will not engage the post 175b until the cam track follower pin is relatively near the exterior end of the track 193. Since, as already explained, the arm 231 is always swung relatively to the tone arm even in case of engagement of the smallest record to be handled, it will be understood that it is never possible to enable the cam track follower pin to reach the exterior end of the track 193 if any record has been engaged. This exterior position and thereby the entrance of the cam track follower pin into the stop track 195 can only be obtained in the event that the tone arm has been allowed to swing inwards the whole way without being obstructed, i.e. in the case that there is no record supported on the center spindle.

When the tone arm reaches its exterior position, irrespectively of where along the track 193 the cam track follower is at this moment, the cam track follower pin will climb the sloping interior surface of the cam track 193, and pass over the surface of the cam disc until it slides down in the track 194.

When the cam disc is moved through that part of its rotation which corresponds to passing the track follower over the surface of the cam disc between the tracks 193 and 194, the tone arm is in its exterior position and the record tested is dropped to the turntable.

In order to obtain the final drop of the record, the cam portion 480 has a further portion of increased radius which pushes the slides 450 further to the left and thereby tilts the arm 400 further against the action of the spring 412 so as to pull the drop control member 524 down from the position shown in full lines in FIGURE 16 to the position shown in dotted lines. During this movement the inclined cam surface 529 slides on the lower end 510c of the slot 510 and causes the record supporting surface 526 to be retracted in the center spindle so that the record can drop freely to the turntable.

The track follower is guided thereafter inwards along the track 194 and causes the tone arm to be landed on the record with the stylus in correct engagement with the initial groove of the record as previously explained. During the initial part of the landing of the tone arm the roller 455 on the slide 450 engages a portion of the cam 480 having decreased radius so as to move the slide 450 to the right and allow the arm 400 to move back under the influence of the spring 412. Furthermore the spring 544 causes the drop control member to be raised and tilted back to the position shown in FIGURE 14.

It will be appreciated that by the operation of the drop control mechanism described a safe engagement of the drop of the record is assured simultaneously with a positive pull of the record in the downward direction to the position in which it is isolated from the remaining stack of records. This isolated position has the advantage that the horizontal plane in which the tone arm is moved inwardly to feel the size of the record is not critical. The controlled movement of the record down to the isolated position further has the advantage that a sudden drop of the lowest record to the isolated position is avoided. Such drop may cause damage of the record due to the small supporting area available for holding the record.

It will also be appreciated that the specific drop control mechanism results in gentle handling of the records during their drop because the record is lifted gently outside the edge of the shoulder 502 so that damage of the center hole of the record by passage of the sharp corner of the shoulder is avoided.

When the record has been played and the pickup stylus enters the outlet groove of the record which is of inclined pitch, the trip starter mechanism is actuated so that the trip starter lever 210 will be engaged by the rotating nose 212 on the turntable bushing and thereby be moved back in the longitudinal direction so that an end flap 210a on the trip starter lever will engage an abutment on the underside of the cam disc and give the latter a push to restart the cyling movement.

When the cam disc is started after playing of a record the cam track follower pin will be in a position adjacent the entrance to the extension 198a of the recess 198. The tone arm will, as previously explained, immediately be raised to an intermediate position. The tone arm will, however, remain in the angular position assumed after having terminated the playing of the record until the cam track follower pin 136 is engaged by the end wall 198b. Before this engagement the cam track follower pin will be engaged at its lower end by the sloping outlet 198c which will prevent the cam track follower pin from glancing off the end wall which would result in a certain outward movement of the tone arm.

The tone arm is then moved outwards with the cam track follower pin 136 along the track 189.

Depending on the relative angular displacement of the arm 231 relatively to the tone arm which was caused by feeling the size of the record that has just been played, the abutment 222 will at a certain stage of the passage of the cam track follower pin 136 through the track 189 engage the post 175b. The outward movement of the tone arm is obstructed thereby, but the cam track follower pin 136 is forced to continue its outward movement until the exterior edge of the track 189. This accordingly results in presetting the angular movement between the arm 131 and the tone arm to such a mutual position which always precedes the inwardly directed test movement.

Thereafter the tone arm is again moved inwards and will, if there are any records left on the center spindle, again engage the edge of the next record to be supplied to the playing position whereafter the movements will be repeated as already described hereabove.

If there are no records on the center spindle, i.e. when for example the last record has been played, the inward movement of the tone arm caused by the track 191 will not be obstructed. Accordingly the preset initial angular position between the arm 131 and the tone arm will not be changed and the cam track follower pin will thus be allowed to pass the whole way out through the track 193 to the exterior end thereof whereafter it enters the stop track 195 which leads concentrically along the periphery of the cam disc to the exterior end of the recess 198 where the tone arm is lowered on the switch and thereby opens the same.

A modification of the phonograph described with reference to FIGURES 1–13 which differs with respect to the stop-and-start control mechanism and the manner in which the cam disc is driven and arrested is described with reference to FIGURES 20–23.

With reference to the embodiments illustrated with reference to FIGURES 20–23 the phonograph has a base plate or chassis 600, a tone arm 650 having a pickup-head 651 including stylus means and a center spindle 500 according to the embodiment described with reference to FIGURES 14–19, for supporting a stack of records to be released in sequence from a support on the center spindle to be fed down to the playing position on the turntable 605. The turntable is driven by a motor (not shown) of which only the driving spindle 601 is shown in FIGURE 21. The driving spindle has a plurality of steps which in a manner which does not form part of the present invention can be selectively engaged by means of the driving friction wheel 603 which is interposed between the driving spindle and for example the rim of the turntable and by suitable speed selector means can be caused to drive the turntable at a plurality of selectable speeds; the selector knob is referred to by reference numeral 606 in FIGURE 20 and is located at the left hand front corner of the chassis 600.

In order to stabilize the stack of records supported on the spindle in parallel relationship relative to the turntable a swingingly arranged stabilizer or ballast arm 607 is provided having a spindle which can slide in a bearing 609 so as to allow the ballast arm 607 to be lifted by hand and swung away for the purpose of loading or unloading the spindle of the turntable. In the operative position of the parts of the phonograph the ballast arm 607 is caused to rest on the top of the stack of records. The phonograph further has a supporting post 653 on which the tone arm 650 rests when the phonograph has been brought to its stop position. Furthermore, at the right hand front corner of the chassis 600 there is provided a start-, stop-, and reject-control knob 613. Furthermore, at the left hand front corner of the chassis a movable control knob 613a is provided which can be shifted between two positions, one position for allowing automatic operation of the phonograph, and another position for allowing manual operation of the phonograph.

The mechanism for controlling the movements of the tone arm is mounted on a supporting bridge member 670 which is secured below the chassis 600. At the right hand end thereof, the bridge is secured to the chassis by means of a pair of posts 675a, 675b. At the left hand end the bridge has a member 671 at the bottom of which there is rigidly secured a hollow spindle 682 which forms a stationary spindle for the turntable 605 and in the longitudinal hollow bore of which the lower end of the center spindle 500 is received. The member 671 has a cavity for receiving a ball bearing to support the turntable. Further the member has a plurality of screw holes for receiving screws by means of which the other end of the bridge 670 is secured to the chassis.

In the embodiment shown there is provided for the purpose of driving the control mechanism for the phonograph during the change cycle a gear mechanism including a friction gear wheel 607 which alternatively to the gear wheel 603 can be caused to engage the motor spindle 601, preferably against a predetermined step thereon so as to cause the change mechanism to be driven at the same predetermined speed irrespective of the turntable speed as selected by the selector knob 606. The friction gear wheel 607 is secured on a shaft 608 which is rotatably arranged in a bushing 609 on a swingingly arranged member 736. At the lower end of the shaft 608 there is provided a pinion 612 which is in constant engagement with another pinion 614 which rotates on a spindle 615 supported in a bearing 616 on the bridge 670. The member 736 is also arranged to swing about the spindle 615. In the orbit of the bearing 609 the chassis 600 has an elongated slot 609 in order to allow the bearing to swing unobstructed when the arm 736 swings.

The start-, stop-, and reject-control knob 613 is rotatable and secured on a shaft 620 which by means of a pin-and-slot connection 621, 622 is connected with a start-, stop-, and reject-arm 624 which is swingingly arranged about a pin 626 on the chassis plate. The other end of the arm 624 is bent vertically into the arm at 628 and has a horizontally extending lip 630 which can move in a slot 632 provided in the chassis plate when the arm 624 is caused to swing in both directions. At the rear end the arm 624 further has a downwardly extending pin 634 by means of which the movement of the arm 624 can be transferred to a switch control arm 636. The switch control arm is connected by means of a pin 646 to a two-armed lever 648 which can swing about a pin 650 and which at the other end has a pin 652 extending through a slot 654 in the chassis.

The left hand end of the switch control arm 636 is guided in an annular slot 656 provided in a pin 658 which is rigidly secured below the chassis plate. Further the rear edge of the switch control arm 636 is cut away at 660 to form a first step and at 662 to form a second step. Furthermore the switch control arm 636 has a pin 664 which engages with an operating arm 666 for closing and opening a switch generally referred to by reference numeral 668.

The knob 613a for causing manual control of the phonograph is arranged on a swingingly arranged arm 670 which can move between two positions referred to by Ia and IIa. In order to transfer the movement of the control knob 613a to stop the phonograph by moving the switch control arm, the end of the arm 670 is connected by means of a lever 672 with the switch control arm 636 by means of a link 674.

The top of the pin 652 is connected with a lever 676 which by means of a link is connected to a lever 678 which can swing about a stationary post 680. Further the top of the pin 652 is connected to a lever 684 which is arranged to slide on the top of the chassis plate 600 and is guided by a pin-and-slot connection. The end of the lever 684 terminates adjacent the bearing 609 in a manner which will be understood more fully from the description of the mode of operation. A spring 686 is interposed between the switch control arm 636 and the stationary parts such as the switch 668 and pulls the arm 636 towards the left so as to engage the end of the one or the other of the steps 660 or 662 against the pin 658 in the bottom of the slot 656 thereof.

As previously mentioned the heart of the phonograph is the cam disc generally designated by reference numeral 690 capable of moving the tone arm by means of a cam follower pin 692 on a cam follower arm 694 through a path which will cause the tone arm to measure the size of the next record to be supplied from the centre spindle by engaging an abutment 651a, see FIGURE 20, against the edge of this record. When the tone arm is caused to measure the size of a record the angle between the cam track follower arm 694 and the tone arm 650 will be changed so as to cause the cam track follower arm to be moved with the cam follower pin 692 across a surface portion of the cam disc at another level than that assumed by the cam follower pin when it follows the tracks in the surface of the cam disc in the case that the movement of the tone arm is not obstructed by engagement of a record on the center spindle. If the tone arm is not caused to measure the size of a record, i.e. if there is no record on the center spindle, the angle between the cam track follower arm and the tone arm will not be changed due to such measuring, and in this event the track follower pin 692 will follow a stop track 696, see FIGURE 21, in the top surface of the cam disc which will lead to the stop position.

The cam disc has, as shown in FIGURE 24, in addition to the stop track 696 a playing recess 698 in which the stop track 696 terminates and in which the track follower pin 692 can move freely during the playing of a record. From the other end of the stop track there is extending an outwardly leading track 700 which adjacent the periphery of the cam disc continues in an inwardly leading track 702. At the interior end this track continues in an outwardly leading track 704 having a sloping wall 704a. Opposite the track 704 there is arranged an inwardly leading track 706 having a sloping wall 706a. This track is the first of a landing track arrangement which continues in a track 708 which merges in the playing recess.

On the cam disc a stop arm 712 is swingingly arranged about a pin 710. One end 714 of the stop arm extends through a slot 716 on the top surface of the cam disc and extends through a slot 716 on the top surface of the cam disc and extends further across the stop track adjacent the inlet to the playing recess 698. When the track follower pin 692 during its passage in the stop track 696 engages the end 714 of the stop arm 712 the latter will be swung counter-clockwise. The rear end of the stop arm 712 has a flap 718 which extends up through a slot 720 in the cam disc and is operable to engage a flap 722 on an arm 625 which forms a part of the start-, stop-, and reject-arm 624, being secured thereto and normally held in the position shown in FIGURE 21 by means of a spring 627 which swings the arm 625 to such a position relative to the arm 624 that a flap 724 engages the left hand edge of the arm 724.

The trip starter arrangement shown in FIGURE 22 includes a trip starter arm 728 which is mounted for swinging as well as reciprocal movement. The trip starter arm 728 has a pin 730 which extends down through a slot in the bridge 670 below which the pin is secured to a triangular plate member 729 which is guided reciprocally by means of a pair of pin-and-slot connections below the bridge. The left hand rear corner of the plate member 729 is so arranged relatively to the pin 634 on the start-and-stop control arm 624 that when this arm under manual operation of the control knob 613 is caused to swing, the pin 634 will engage the plate 729 and cause it to move towards the right. The normal movement of the trip starter arm 728 takes place when it is engaged at its front by a lug 731 on the rotating turntable boss 733. Normal counter-clockwise swinging of the trip starter arm 728 is caused by a trip starter control arm 725 which in its turn is caused to swing about a pin 725a on the bridge by means of a trip starter actuating arm 727 rigidly secured to the tone arm spindle so as to follow the tone arm when the stylus thereof follows the sound track of a record. In a well known manner the increased inward movement of the tone arm when the stylus enters the outlet track on the record will cause the trip starter arm to be engaged by the rotating lug 731 on the turntable boss 733.

In the present embodiment the trip starter mechanism includes a link system comprising a lever 732 swingingly arranged about a pin 734. The lever 732 is by means of a link 732a connected with an end 731 of the swingingly arranged lever 736 on which the change cycle driving gear wheel structure is supported. A spring 742 is interposed between the pin 734 and some other suitable point. The pin 734 extends through an aperture 744 in the bridge so as to allow the arm 732 to move freely within a limited range of movement that comprises swinging as well as reciprocal movement. The rear end of the arm 732 has a flap 746 which is adapted to be engaged by an abutment 748 on the underside of the cam disc.

The cam disc 690 further has cam portions capable as according to the first embodiment of controlling the raising and lowering of the tone arm by means of a tiltable raising lever 750 which has a roller 752 that engages these cam portions. The rear end of the raising lever is slotted at 754 and is capable of engaging a small bushing 756 on a screw-threaded end of a pin 753 which extends up through the tone arm spindle 750. The position of the bushing 753 can be adjusted so as to set the necessary level to which the pickup arm is intended to be lifted. The cam portions controlling the raising and lowering comprises an inclined surface 764 along which passes the roller 752 provided on the raising lever when the tone arm is lowered to engage the stylus with the sound track on a record. In this position the abutment 748 on the cam disc will engage the flap 746 on the arm 732, and due to the tension of the spring which presses the roller on the raising lever against the cam portions controlling the raising and lowering of the pickup this will result in drawing the arm 732 in the direction of the arrow shown in FIGURES 21 and 22. Due to the play of the pin 734 in the aperture 744 this movement is sufficient to allow the cam gear arm 736 to be swung to disengage the cam gear wheel 607 from the motor spindle 601.

In order to allow the cam follower pin 692 to climb the sloping wall 704a of the track 704 and descend along the sloping wall 706a of the track 706 the track follower arm 694 is tiltable against resilient action and associated with the tone arm to swing relatively thereto against friction.

As shown in the exploded view in FIGURE 22 the cam follower arm has a portion 770 which is in the form of a washer having an aperture 772 for the passage of the tone arm spindle 760. The portion 770 is coupled to a friction disc structure which includes a disc 774 concentric with the tone arm, a friction washer 776, and a second disc 778 which forms a part of the trip starter actuating arm 727. The disc 778 is prevented from rotating relatively to the tone arm spindle. In the embodiment of FIGURE 22 the cross section of the lower end of the tone arm spindle is polygonal and the disc 778 has a corresponding hole.

As further shown in FIGURE 22 the upper portion of the tone arm spindle has a downwardly facing shoulder 780 against which a washer 782 engages. Below the washer there is provided a spring 784 which in its turn presses a further washer 786 downwardly to engage a pair of flaps 772a, 772b extending into the aperture 772 of the washer part 770 associated with the cam follower arm 694.

The coupling between the cam follower arm structure and the disc 774 of the friction link structure is made in the form of a pair of coupling members such as a pair of balls engaging in pairs of axially aligning holes in the washer portion 770 and the disc 774 respectively. These coupling members or balls may be arranged diametrically opposite to the tone arm spindle, the flaps 772a, 772b being arranged laterally disposed thereto in the direction of the extending cam follower arm 694.

It will be appreciated that when the parts are pressed together by means of the spring 784 the cam follower arm can be tilted slightly up and down against a resilient force which is determined between the distance between the line connecting the ball members and the line connecting the flaps 772a, 772b and the tension of the spring which in its turn also presses the discs 774, 776, 778 forming the friction link structure against each other. In the embodiment of FIGURE 22 the lower end of the tone arm spindle is provided with a clip spring 790 forming a stop for the disc 778, but it will be appreciated that the disc 778 may be rigidly secured on the tone arm spindle.

On the top of the tone arm spindle 760 there is secured, for example by clamping or in any other suitable way, a bushing 792 on the top of which there is provided a bracket 794 on which the tone arm is supported to be lifted and lowered.

The cam disc 690 furthermore has a portion designed to control the drop of the records. This mechanism is exactly as described with reference to the embodiments according to FIGURES 1–13 and will therefore not be further described here.

The embodiment described with reference to FIGURES 20–23 operates in the following manner starting from the position of the parts shown in FIGURE 21 which is supposed to be the position of rest to which the parts are brought after the phonograph has been stopped.

The pin 634 at the rear end of the start control arm 624 engages in a triangular notch in the front edge of the switch control arm 636 in such a manner that when the start control arm 624 is rotated clockwise it will pull the switch control arm towards the right, while on the other hand when the switch control arm 636 is moved in the same direction, i.e. towards the right by means of the manual start control knob 613a, this movement will not be transmitted to swing the start control arm.

Assuming now that the phonograph is to be used as a record changing phonograph the start takes place by rotating the control knob 613 counter-clockwise and then releasing the knob. This will cause the start control arm 634 to be swung clockwise in such a manner that the pin 634 will pull the switch control arm 636 towards the right.

In the position of rest the abutment 748 which extends below the cam disc engages the flap 746 on the arm 732, and as previously explained this causes the cam gear structure supporting arm 736 to be kept swung to a position in which the gear wheel 607 is disengaged from the motor spindle 601.

When the start control arm 624 is swung clockwise this will cause not only the arm 636 to be pulled towards the right but the pin 634 will engage the left hand rear corner of the plate member 729 to be moved towards the right. Since this plate is connected with the trip starter arm 728, the pin 730 will engage the arm 732 and cause this arm to move so as to relieve the abutment 746 from the abutment 748. Simultaneously the movement of the switch control arm 636 will be sufficient to cause this arm to be brought to a position in which the second step 662 on the arm engages the narrow part of the pin 658 in the groove 656 thereof, and during this movement the control arm 666 for the switch 668 will be thrown over to close the motor switch. The swinging movement of the start arm 624 in order to engage the plate 729 and cause the swinging of the arm 732 as described herein is somewhat larger than necessary in order to move the switch control arm 636 to the switch-engaging position with the result that initially also the arm 648 is swung which causes the arm 684 to be pushed forward to engage the bearing 609 and thereby initially preventing the gear wheel 607 from engaging the motor spindle. Simultaneously the arm 676 is pushed forward which swings the arm 678 to a position in which the gear wheel 603 engages the motor spindle. When the control knob 613 is relieved, the spring 686 will pull the switch control arm 636 slightly back until the shoulder adjacent the end of the step 662 engages the narrow portion of the pin 658 which will swing the arm 648 back clockwise sufficient to relieve the end of the arm 684 from the bushing 609 so that the spring 742 now causes the gear wheel 607 to engage the predetermined step on the motor spindle. Due to the "floating suspension" of the arm 732 and the direction in which the spring 742 pulls, the arm 732 will, when it is relieved be in a position in which the flap 746 is free of the abutment 748 extending below the cam disc so that the engagement of the driving gear mechanism for the cam disc will cause this to be rotated. The return stroke of the arm 648 simultaneously causes a return stroke of the arm structure 676, 678. This return stroke is, however, not sufficient to disengage the main driving gear wheel 603 which will remain engaged with the driving spindle 601 and the rim of the turntable so as to cause the turntable to be driven. During the rotation of the cam disc the pickup arm will initially be raised from the supporting post 653 whereafter the cam follower pin 692 either, if the phonograph is started from the neutral position, will be guided in a by-pass track 700a, or, if the phonograph is started after a record has been played, will be guided outwardly through the track 700.

If the cam disc is started with the parts in the neutral position and the track follower passes through the by-pass track 700a the pickup arm will remain in its exterior position. Then the cam follower pin 692 will be guided inwards in the track 702 until the abutment 651a engages the edge of the next record to be supplied from the center spindle to the turntable. At this point of the movements the further movement of the tone arm is interrupted but the cam follower pin 692 is caused to follow the track 702 to the interior end thereof with the result that the angle between the cam follower arm 694 and the tone arm will be changed governed by the size of the record engaged. This change takes place by overcoming the friction between the discs 774, 776 and 778 of the friction link, the disc 774 being caused to rotate with the arm 694 and its disc 770 by the coupling members between these discs.

The cam follower pin 692 thereafter moves out into the track 704 which swings the tone arm outwards until an abutment 778a on the disc 778 connected with the tone arm spindle 760 engages the stationary post 675a. At this point the further outward movement of the tone arm is interrupted. Due to the existence of the sloping wall 704a of the track 704 the track follower 692 is not caused to follow the track 704, but the track follower can climb the inclined wall 704a by tilting the lever 694 against the resilient action of the spring 784, i.e. the cam follower 692 climbs the wall 704a at a point along the track 704 which is governed by the size of the record so as to approach the landing track arrangement at a radial distance from the center of the cam disc governed by the size of the record. The track follower then passes over the surface of the cam disc between the tracks 704 and 706. During this part of the rotation of the cam disc the record drop control arm is actuated to relieve the record tested which takes place when the tone arm is in its most exterior position.

When the track follower 692 enters thereafter the initial part of the landing track arrangement it descends in the track 706 along the sloping wall 706a thereof, the cam follower arm being biased downwardly by means of the spring 784.

The cam follower then follows the landing track 708 which merges in the playing recess 698 and the tone arm is landed with its stylus to engage the initial sound track of the record correctly.

During the last part of the rotation of the cam disc the abutment 748 engages the flap 746 and causes movement of the arm structure resulting in a counter-clockwise swinging of the arm 736 which disengages the driving gear 607 from the motor spindle. In the position of rest of the cam disc during playing of a record the cam disc is positioned by the engagement of the roller 752 and the pair of flaps 764.

If during the change cycle the inward movement of the tone arm is not obstructed by engagement of the edge of a record on the center spindle, the mutual position between the cam follower arm 694 and the tone arm which is preset after each playing of a record thereby that when the tone arm is moved outwardly under control of the cam follower 692 through the track 700, the outward movement of the tone arm is stopped by engagement between the flap 778a and the stationary post 675a while the cam follower 692 must follow the track 700 to its exterior end will not be changed when the cam follower moves inwardly through the track 702. The preset position between these two arms is so adapted that when the mutual angle is not changed this will bring the cam follower 692 to be moved out through the entire length of the track 704 to enter the stop track 696 with the result that if no record has been engaged the track follower 692 will follow through the stop track and at the last part thereof engage the end 714 of the stop arm 712 which thereby will be swung counter-clockwise as in FIGURE 21 so that its abutment 720 engages an abutment 722 on the arm 625 associated with the stop arm 624 and cause the latter to be swung counter-clockwise. This will cause the pin 634 to engage the inclined wall of the notch at the front end of the switch control arm which thereby will be caused to swing counter-clockwise about the pin 646. This relieves the right hand end of the step 662 from its engagement with the pin 658 and the spring 686 will then pull the switch control arm 636 towards the left and open the switch. Simultaneously the arm 648 will be swung which again will cause the arm structure 676, 678 to be swung sufficiently to disengage the main driving gear wheel 603 from the motor spindle 601 so that the phonograph will be stopped.

The phonograph can be stopped in a similar manner under manual control by rotating the control knob 613 clockwise which will cause the same movement of the arm 624.

The reason why the resiliently arranged arm 625 is interposed between the arm 624 and the stop abutment 720 on the cam disc is to provide for safety against clamping of the parts in case of faulty operation, for example if the operator simultaneously with initiating the stop rotates the control knob 613 in the clockwise direction and retains it there during the operation of the automatic stop mechanism.

As mentioned hereinbefore the phonograph can also be used as a semi-automatic single player by operating the control knob 613a. In this event the control knob 613 is not used, and the phonograph is started by moving the control knob 613a from the position Ia to the position IIa. The lever 672 is pushed thereby lengthwise and this movement is transmitted through the link 674 to the switch control arm 636 which is moved towards the right in the same manner as if it had been pulled as a result of clockwise rotation of the start control arm 624. Due to the inclined portion of the notch where the pin 634 engages, a manual operation will not result in swinging of the arm 624 so that the pin 634 will not be moved to engage the plate member 729 and thereby start the cam disc. Accordingly start by manual control will result in switching on the motor and the main driving gear 603 only so that the turntable starts to rotate. Thereafter the tone arm is lifted by hand and lowered on the record supported on the turntable to engage the stylus in the initial sound groove.

The invention is not limited to the embodiments shown and described here above.

Thus, for example, it may be advisable to provide means for preventing the drop control arm 400 from tilting during the initial part of the stroke until the record has been pushed sidewardly so as to thereby retain the upwardly facing shoulder 526 of the drop control member 524 in a plane slightly above the upwardly facing shoulder 502 on the spindle and thereby cause a gentle lifting of the record to the position in which its center hole aligns with the lower part of the center spindle.

This may as indicated in FIGURE 14 be obtained by providing a post 411 extending below the bridge 170. The post 411 has an annular recess 413 which engages in a keyhole-like slot 415 in the arm 400. The movements of the arm 415 are in such case so adapted that during the initial part of its drop control stroke the arm is guided in a predetermined plane by the narrow portion of the keyhole-like aperture 415 so as to prevent the drop control member 524 from being lowered under influence of the weight of the stack of records. Only during the lowering of the record to isolate it from the remaining records of the stack the drop control member is moved to such a left hand position that the wide part of the keyhole-like aperture 415 aligns with the lower end of the post 411 so as to allow the arm 400 to tilt.

A further modification of the drop control mechanism is shown in FIGURE 24.

In the bridge 170 a slot 444a is provided for allowing recepirocating movement of a member 447 on which the roller 455 which engages the drop control cam portion 480 of the cam disc 180 is arranged. This cam portion has in the case of the embodiment described hereinabove portions of different radii so as to control the movement of the member 447. The member 447 has a downwardly extending bracket 449 on which a lever 451 is arranged pivotally about a pin or the like 453. The front end of the lever 451 has a slot 451b through which the lower end 541 of the drop control member 524 extends. A pair of transverse pins or similar abutments 524l and 524k are provided on the drop control member on each side of the lever 451 so as to enable the drop control member to be raised and lowered in response to tilting of the lever 451.

At the other end of the lever 451 a track follower 453, such as a roller, is provided to engage a downwardly facing cam portion 457 having a plurality of sections in different planes which serve to control the tilting of the lever 451. A spring 459 is interposed between the lever 451 and the bridge 170 pulling in such a direction that it will retain the lever 451 in a retracted position with the roller 455 in engagement with the periphery of the cam portion 480.

During the operation a portion of increased radius of the cam 480 will initially push the reciprocating member 447 to the left. During this movement the lever 451 will initially be retained in the same plane by the engagement between the roller 453 and a section of the cam portion 457. The drop control member will be tilted thereby so as to clamp the lowest record on the center spindle during a sideward movement thereof. When the record has been brought in this position the lever 451 will be tilted thereby that the spring 459 retains the roller 453 in engagement with an inclined section of the cam portion 457 in a different plane and thereby the drop control mechanism will be operated in the manner as described in connection with the first embodiment.

I claim:
1. A phonograph having a centre spindle for supporting a stack of records to be supplied one by one to the turntable and having means for supporting the remaining part of the stack, if any, while the lowest record is supplied to the turntable, means operable to clamp the lowest record in its centre hole means operable to positively pull said record down to a position isolated from the remaining records of the stack, and means thereafter operable to release said clamping means and allow said record to drop to the turntable.

2. In a phonograph, a center spindle structure comprising support means for supporting a stack of records to be supplied one by one to the turntable, drop control means having at least one member provided with means operable to effectively expand in the center hole of the lowest record of the stack to clampingly hold said lowest record and move the same downwardly with said means effectively expanded to clampingly hold said lowest record so as to thereby isolate said lowest record from the remaining records, if any, in the stack, means for supporting the remaining part of the stack, if any, while the lowest record is supplied to the turntable, and means operative after such downward movement of the lowest record to release said lowest record and enable it to be dropped onto the turntable.

3. A phonograph having a centre spindle, means for supporting a stack of records to be supplied one by one to the turntable and means for supporting the remaining part of the stack, if any, while the lowest record is supplied to the turntable, comprising at least one drop control member having an upwardly facing shoulder for supporting the lowest record of the stack during the drop operation and an outwardly facing abutment surface, the drop control member having a plurality of drop control movements essentially consisting of first being moved in the radial direction to engage the outwardly facing surface with the centre hole of the record and then being moved in the axial direction of the centre spindle for positively lowering the record while the remaining records of the stack, if any, are supported on the centre spindle so as to isolate the lowest record from the remaining part of the stack during the drop operation, and thereafter the drop control member being retracted in the radial direction to allow drop of the record, and means operatively connected with said drop control member for effecting said drop-operation movements including means for first moving said drop control member in said radial direction, means for thereupon moving said drop control member in said axial direction for positively lowering the said lowest record, and means for thereafter retracting said drop control member to enable drop of the said lowest record.

4. A record changing phonograph having a feeler member for gauging the size of the next record to be played, and a center spindle for supporting a stack of records to be supplied one by one to the turntable provided with means for supporting the remaining part of the stack, if any, while the lowest record is supplied to the turntable, comprising a center spindle mechanism having means for engaging the lowest record in the stack to clamp the record and positively pull the clamped record downwardly to a position isolated from the remaining records, if any of the stack and for thereafter releasing the record to drop to the turntable, a control mechanism having first control means for controlling the movements of the center spindle mechanism and second control means for controlling the movements of said feeler member to gauge the size of the next record to be played in such timed relationship relatively to the movements of the parts of the center spindle that the size of the record is gauged in the isolated position thereof, said first control means including means operative upon completion of the gauging operation to drop the record to the turntable, and means to move the tone arm to the start-of-play position for playing the record when supported on said turntable after completion of the record drop operation.

5. A phonograph as claimed in claim 4, wherein said centre spindle mechanism includes at least one drop control member having an upwardly facing shoulder for engaging the underside of the lowest record in the stack, said drop control member being movable in the axial direction and retractable into the interior of the spindle after having moved through its stroke, said center spindle mechanism being further provided with at least one radial movable clamping surface operating in timed relationship with the drop control member to engage and clamp the lowest record in the stack in its centre hole and movable axially with the drop control member during its stroke as well as releasable in an inward radial direction to disengage the center hole of the record when it is dropped.

6. A phonograph as claimed in claim 5, in which said clamping surface is a surface of the drop control member above the upwardly facing shoulder thereof and in which the drop control member is moved by said first control means in a sequence which first comprises a radial outward movement to support and clamp the lowest record, an axial downward movement to isolate the lowest record from the remaining part of the stack and then a radial retraction to release the record.

7. A phonograph as claimed in claim 4, wherein said center spindle mechanism includes a member slidable along the surface of the spindle diametrically opposite the drop control member and located to be engaged by the centre hole of the lowest record when the clamping surface is actuated to engage the centre hole of the record, and means for moving said slidable member with said drop control member.

8. A phonograph as claimed in claim 7, in which the centre spindle is of the type having an upwardly facing shoulder for engaging the underside of the lowest record in the stack in a position in which the centre hole of the record is eccentrically displaced relative to the lower portion of the centre spindle, and in which said clamping surface is operable to displace the lowest record sidewardly to initiate its drop.

9. A phonograph as claimed in claim 8, in which said drop control member is in the form of an elongated lever mounted for swinging movement in a slot of the centre spindle as well as for longitudinal displacement therein.

10. A phonograph as claimed in claim 8 in which an inclined cam surface is provided on the outside of said drop control member below the upwardly facing record supporting shoulder thereof for causing retraction of the drop control member to the interior of the centre spindle by engagement with the lower end of the slot at the end of the downward stroke of the drop control member.

11. A phonograph as claimed in claim 7, in which the centre spindle is provided with a flat external surface portion over a part of its length, and in which said slidable member is in the form of at least one flap arranged to slide along the flattened surface portion.

12. A phonograph as claimed in claim 11, wherein said means for moving said slidable member with said drop control member is operative to move said slidable member together with said drop control member axially within the centre spindle, said flap being a sidewardly extending flap sliding along said exterior flattened surface portion and being guided for axial movement without participating in the tilting movement of said drop control member.

13. A phonograph as claimed in claim 7, in which said slidable member is secured against tilting movement.

14. A phonograph as claimed in claim 13, in which said slidable member is guided in a tubular portion of the centre spindle.

15. In a phonograph having a center spindle provided with first means for supporting a stack of records to be supplied sequentially to the turntable, a drop control mechanism comprising second means adapted to engage within the center hole of the lowest record supported on said first means, and means including said second means for clamping said lowest record and for positively moving said lowest record while clamped to an intermediate position in which said lowest record is isolated from the remainder of the stack of records, said last-named means being operative to release the downwardly moved and clamped record only a predetermined time after isolation thereof from the remainder of the stack.

References Cited in the file of this patent

UNITED STATES PATENTS

| | | |
|---|---|---|
| 2,512,701 | Weaver | June 27, 1950 |
| 2,523,045 | Miller et al. | Sept. 19, 1950 |
| 2,626,157 | Jablonski | Jan. 20, 1953 |
| 2,641,474 | Zandelin | June 9, 1953 |
| 2,726,088 | DaCosta | Dec. 6, 1955 |
| 2,818,263 | Dale | Dec. 31, 1957 |
| 2,873,977 | Manning | Feb. 17, 1959 |

FOREIGN PATENTS

| | | |
|---|---|---|
| 849,014 | Germany | Sept. 11, 1952 |
| 811,011 | Great Britain | Mar. 25, 1959 |